(12) United States Patent
Piety et al.

(10) Patent No.: US 9,199,360 B2
(45) Date of Patent: Dec. 1, 2015

(54) SENSOR MOUNTING APPARATUS AND METHODS OF USING SAME

(71) Applicant: Azima Holdings, Inc., Woburn, MA (US)

(72) Inventors: Kenneth Ralph Piety, Knoxville, TN (US); K. C. Dahl, Bainbridge Island, WA (US); Wylie Moreshead, Bainbridge Island, WA (US)

(73) Assignee: Azima Holdings, Inc., Woburn, MA (US)

( * ) Notice: Subject to any disclaimer, the term of this patent is extended or adjusted under 35 U.S.C. 154(b) by 396 days.

(21) Appl. No.: 13/661,910

(22) Filed: Oct. 26, 2012

(65) Prior Publication Data

US 2014/0117059 A1   May 1, 2014

(51) Int. Cl.
| | |
|---|---|
| B25B 23/00 | (2006.01) |
| B25B 13/48 | (2006.01) |
| B25B 15/00 | (2006.01) |
| B25B 23/18 | (2006.01) |
| A45F 5/02 | (2006.01) |
| F16B 21/12 | (2006.01) |
| F16B 23/00 | (2006.01) |
| F16B 41/00 | (2006.01) |

(52) U.S. Cl.
CPC .......... *B25B 13/48* (2013.01); *A45F 5/021* (2013.01); *B25B 15/008* (2013.01); *B25B 23/18* (2013.01); *A45F 2200/0575* (2013.01); *F16B 21/125* (2013.01); *F16B 23/0038* (2013.01); *F16B 41/002* (2013.01)

(58) Field of Classification Search
CPC . A45F 2200/0575; A45F 5/021; B25B 13/48; B25B 15/008; B25B 23/18; F16B 21/125; F16B 23/0038; F16B 41/002; G01L 19/147
See application file for complete search history.

(56) References Cited

U.S. PATENT DOCUMENTS

| | | | | |
|---|---|---|---|---|
| 2,725,770 | A * | 12/1955 | Short et al. ...................... | 81/475 |
| 4,885,707 | A * | 12/1989 | Nichol et al. .................... | 702/56 |
| 5,582,081 | A * | 12/1996 | Lin ................. | 81/63.1 |
| 7,114,418 | B1 * | 10/2006 | Allen .............................. | 81/439 |

OTHER PUBLICATIONS

Grip Rite fasteners catalog Oct. 2010.*
ASM Accurate Screw MAchine product fasteners catalog 2011.*
All American Products detent pins catalog 1996.*
ASM II accurate screw machine product catalog 2011.*

* cited by examiner

*Primary Examiner* — Freddie Kirkland, III
(74) *Attorney, Agent, or Firm* — Pitts & Lake, P.C.

(57) ABSTRACT

An apparatus to allow a one-handed operation of mounting a vibration sensor to a mounting pad adhered to a machine. An attachment screw includes a recessed socket with a detent to releasably retain a ball-end hex driver such that the driver can remain coupled to the attachment screw without force being applied by the user. Also, a handheld device includes a driver having a handle portion and a driver shaft extending therefrom, the driver shaft having a driver portion at a distal end, and a vibration sensor support configured to support the vibration sensor such that the driver portion has access to an attachment screw threaded through the vibration sensor, and coupled to the driver such that the vibration sensor support is rotatable around a longitudinal axis of the driver shaft and slidable along a longitudinal portion of the driver shaft.

32 Claims, 14 Drawing Sheets

SENSOR MOUNTING APPARATUS AND METHODS OF USING SAME

CROSS-REFERENCE TO RELATED APPLICATIONS

Not Applicable

FIELD OF INVENTION

The present general inventive concept relates to an apparatus, system, and method of mounting a sensor on a mounting pad, and, more particularly, an apparatus, system, and method by which a user can mount/dismount a triaxial sensor to/from a machine with a one-handed operation.

BACKGROUND

Predictive Maintenance, or PdM, programs in industrial plants are frequently implemented by assigning a technician to use portable instrumentation, such as a vibration analyzer, an ultrasonic gun, and/or an IR camera, along a predetermined route to collect data related to the operation of the equipment on this route. This information, in turn, may then be used to diagnose problems or potential problems associated with the health and/or operation of the equipment.

For example, a PdM program may include a technician carrying a vibration analyzer to each machine located along a defined route. Upon reaching a particular machine to be analyzed, a vibration sensor, such as an accelerometer, is physically coupled to the machine at one or more measurement locations. Frequently, the data to be acquired at each measurement location is specified as part of the route instructions. The vibration sensor and analyzer then receive vibration data from the measurement locations, and may output this information on a display of the analyzer.

There are a number of options for coupling vibration sensors to the machinery, and a variety of sensor configurations which have been employed. Two factors which have a significant impact on the sensor and mounting method selected are the speed and ease of mounting and the resulting frequency response of the mounted vibration sensor. Accelerometers are the most often used vibration sensors because they are affordable and relatively easy to handle when mounting and removing them from machines. It is common for these sensors to be calibrated to have a flat frequency response from 0 to 10 kHz. This wide frequency response is quite acceptable for machine measurements; however, it is generally only achieved when significant attention is given to its mounting method. It is widely recognized that stud mounting the sensor to a flat machined surface provides the best results, approaching that which is used during the calibration procedure. However this is hard to achieve in an industrial environment in which a portable sensor is being used to monitor all types of machine designs. It may be desirable for a single operator to collect data from 50 or more machines in one 8-hour shift, due to the desire to reduce the cost of data collection by reducing the man-hours required. The cost of the data collection labor will greatly exceed the investment made in the PdM analyzers and software over time. One solution to gain speed is to hand-hold the sensor against the machine or to mount the accelerometer using a magnet that is stud-mounted to the sensor housing. These methods are quick; however, they often result in lowering the flat sensitivity region to less than 1 kHz. This frequency response can be improved by using mounting pads that are fixed to a flat surface on the machine housing, such as with a special epoxy. These pads provide an additional benefit in that they insure that the data is collected from exactly the same position on the machine on every monitoring cycle regardless of who is collecting the data. Rare earth magnets attached to the accelerometers and placed on the pad may increase the flat frequency response achieved to 2-4 kHz. Stud mounting the sensor to these pads can result in a flat frequency region which is close to that achieved during calibration.

Single axis and triaxial accelerometers have become popular choices for portable PdM applications. Single axis accelerometers have the broadest use because of their smaller size, lower cost, and ease of use with magnetic mounting options, and because many early instruments could only collect a single channel of data. The triaxial accelerometer has also become popular since the advent of multi-channel data collection instruments because it allows 3 channels of data to be collected at one time. It is often desirable to collect data in three spatial axes (x, y, and z directions) at each bearing housing on the machine. To accomplish this with a single axis sensor, the operator must position the sensor at each of the three orientations and make a measurement. Clearly, this increases the data collection time three-fold, which is not desirable. However, the use of triaxial accelerometers dictates the use of mounting pads in order to get repeatable data collected. It is not desirable for the operator to have to remember how the sensor should be oriented at each location, or to experiment with its placement to try and repeat the orientation used in the previous application. To insure repeatable positioning of a triaxial accelerometer, the sensors and the mounting pads are manufactured with mating alignment structures. The most common practice followed by the manufacturers of triaxial accelerometers is to use a center mounting screen and a cylindrical alignment pin built into the mating surface of the sensor and positioned to be aligned with the axis of one of the three internal sensors. This alignment peg can be used to mate with a hole or notch in the mounting pad to guarantee repeatable positioning of the sensor on repeated applications.

This option of using triaxial accelerometers and mounting pads with a center thread hold and an alignment notch is a long standing practice of more than ten years. The sensors are typically gripped in one hand and aligned to the block, while the other hand of the user holds a ball driver to thread the mounting screw into the center hole of the pad. There has been virtually no change in the mechanical design for mounting the sensor to these pads for more than a decade.

As previously discussed, the vibration sensor is typically coupled to a mounting pad that has been previously fixed to the machine that is to be analyzed, and the operator, or user, mounts the vibration sensor to the mounting pad to begin the analysis. FIG. 1 illustrates a conventional triaxial accelerometer and mounting pad used in such a vibration measurement. As illustrated in FIG. 1, the mounting pad 101 is fixed to an outer surface of a machine 102 such as would be found in a factory. As several different types of machines, appliances, etc., may be monitored in a vibration measurement, for convenience of illustration, only a surface portion of the machine 102 upon which the mounting pad 101 is fixed is illustrated in this drawing. Also, the mounting pad 101 may be fixed at several different locations on the machine 102, such as on a side, top, or bottom surface.

Referring to FIG. 1, the mounting pad 101 is provided with an alignment recess 103 to aid in the proper orientation of the triaxial accelerometer, referred to generically herein as a vibration sensor 104. As indicated in FIG. 101, the vibration sensor 104 is designed such that movement in each of the X, Y, and Z axes is measured, the proper orientation of the vibration sensor 104 is achieved through mounting the vibration sensor 104 such that an alignment pin 105 of the vibration sensor 104 is received in the alignment recess 103 of the mounting pad 101. Thus, the mounting pad 101 is previously fixed to the machine 102 with the alignment recess 103 at the proper position to receive the alignment pin 105 at the proper orientation. The vibration sensor 104 is typically provided with a data cable 110 to transmit the sensed vibration data to a data acquisition unit (not illustrated).

Upon aligning the vibration sensor 104 according to the proper placement of the alignment pin 105 in the alignment recess 103, an attachment screw 106 is used to fix the vibration sensor 104 to the mounting pad 101. The attachment screw 106 is passed through a threaded through hole 107 of the vibration sensor 104 into a threaded receiving aperture 108 of the mounting pad 108. The attachment screw 106 typically has a hex socket 109 so that the attachment screw 106 may be driven by a hex key or driver. The attachment screw 106 is driven, with the threads of the attachment screw moving along the threaded receiving aperture 108, until the head of the attachment screw 106 is flush against the outer surface of the vibration sensor 104, at which point the vibration sensor 104 is fixed in position.

The conventional method of mounting the vibration sensor 104 on a mounting pad 101 typically requires a user to employ both hands to perform the sensor mounting operation. FIG. 2 illustrates a conventional method of mounting the vibration sensor 104 onto the mounting pad 101. As illustrated in FIG. 2, the user holds the vibration sensor 104 in one hand, both to move the vibration sensor 104 into the proper orientation according to the alignment pin 105 being received in the alignment recess 103, and also to hold the vibration sensor 104 in position while the attachment screw 106 is driven by a driver 201 held in the user's other hand. As illustrated in FIG. 2, the driver 201 typically is provided with a hex key 202 on a driving end thereof. Even if the user advances the attachment screw 106 far enough through the threaded through hole 107 such that the end of the attachment screw 106 extends out of the surface of the vibration sensor 104 which faces the machine 102, so that threading of the attachment screw 106 into the receiving aperture 108 may be started before the proper orientation of the vibration sensor 104, both hands of the user are still required so that both the vibration sensor 104 and the driver 201 can both be held to perform such an operation.

As previously discussed, the mounting pad 101 may be provided on various different surfaces of the machine 102, including the underside, recessed portions, etc., that are very difficult for a user to reach with both hands to perform the simultaneous holding of the proper orientation of the vibration sensor 104 and the driving of the attachment screw 106. Also, even in a situation in which access to the mounting pad 101 is relatively easy, it is an inconvenience for the user to have to use both hands to perform the mounting operation, as one hand could be otherwise used to operate a data collecting device, cellular phone, etc.

As discussed above, for a variety of reasons, there is a desire for a mounting mechanism to improve the safety and speed of this approach. One concern is that the operator typically has an instrument that usually needs to be controlled while the operator is attaching the sensor to locations which are often not convenient. Additionally, the machine surface may be hot or coated with undesirable chemicals. Placing one's hands within ½ inch of the machine housing, possibly near to moving parts, is not desirable from a safety perspective. The sensor or ball driver can also represent a hazard if dropped or made to contact moving parts of the machine. Thus, there is a desire to improve the method of attaching a triaxial sensor to an indexed mounting pad using a one-hand operation that is faster and safer than those currently available.

Another consideration in improving the speed of mounting is dependent on how the sensor and attachment tool are carried when moving from one measurement location to the next, on the same or a different machine. The operator is often moving about in rather restrictive areas in which both hands are needed to prevent potential accidents, which is problematic when the operator is carrying the sensor and mounting equipment. Also, the vibration sensor is a delicate and expensive component, and the vibration sensor may be in jeopardy of being damaged due to inadvertent contact with various hard surfaces on the way to being mounted, or due to being dropped by the user during the operation. Therefore, a device that would provide support and protection for the vibration sensor during the mounting process would be of value.

The improvement in operator safety is always of utmost importance in any industrial operation. The significance of increasing the speed and ease of mounting a sensor to the machine may not be appreciated unless it is realized that an operator may perform this operation literally hundreds of times during a typical measurement survey. The cumbersome nature of mounting triaxial accelerometers has been one of the factors which has slowed their adoption by industry even though their use offers many advantages.

BRIEF SUMMARY

The present general inventive concept provides a device to allow a one-hand operation of mounting a vibration sensor to a sensor mount fixed to a machine. In order to improve efficiency, it is possible for the mounting tool to stay engaged with the vibration sensor when the vibration sensor is not mounted. In various example embodiments the mounting tool engages the sensor in such a manner that the vibration sensor is held firmly by the mounting tool during mounting as well as when the components are holstered between measurement locations. Such a one-hand operation is available when a mounting tool is able to stay engaged with the vibration sensor during the mounting operation, as well as during movements between mounting operations.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by an attachment screw to secure a vibration sensor to a mounting pad, the vibration sensor having a through hole to receive the attachment screw and an alignment pin extending to be accommodated in an alignment recess of the mounting pad, the attachment screw including a head portion having a recessed socket sufficiently deep to receive a ball-end hex driver such that a hex cavity adjacent to the ball-end hex driver is received within the recessed socket, a detent provided on a side wall of the recessed socket to apply a force to the hex cavity such that the hex key is releasably retained in the recessed socket, and a cylindrical shaft extending from the head portion, the shaft having a threaded section provided between first and second unthreaded sections, the first and second unthreaded sections having a diameter smaller than the threaded section, and the second unthreaded section being distal to the head portion and configured such that at least a portion thereof extends further than the alignment pin when the attachment screw is in the through hole and the head portion contacts the vibration sensor.

The first unthreaded section may be configured to extend past a threaded portion of the through hole while the attachment screw is in the through hole and the head portion contacts the vibration sensor.

The attachment screw may further include a resilient member to bias the detent toward a radial center of the recessed socket.

The attachment screw may further include a recess in the head portion, the detent being provided in the recess.

The recess may have a tapered opening to allow the detent to partially extend into the recessed socket.

The resilient member may be an elastic band provided around the head portion.

The attachment screw may further include a groove around a perimeter of the head portion to receive the elastic band.

The elastic band may be a polyurethane ring.

The threaded section may be configured so as to extend a shorter distance from the vibration sensor than does the alignment pin when the attachment screw is in the through hole and the head portion contacts the vibration sensor.

The threaded section may be configured so as to extend farther from the vibration sensor than does the alignment pin when the attachment screw is in the through hole and the head portion contacts the vibration sensor.

The attachment screw may further include a frictional element provided to at least a portion of the attachment screw to provide friction between the attachment screw and the vibration sensor to aid in orientation of the vibration sensor during a mounting operation.

The frictional element may be provided to at least a portion of the first unthreaded section of the attachment screw.

The frictional element may be a polymer coating.

The foregoing and/or other aspects and advantages of the present general inventive concept may also be achieved by a handheld device to secure a vibration sensor to a mounting pad, the vibration sensor having an alignment pin extending to be accommodated in an alignment recess of the mounting pad, the device including a driver having a handle portion and a driver shaft extending therefrom, the driver shaft having a driver portion at a distal end, and a vibration sensor support configured to support the vibration sensor such that the driver portion has access to an attachment screw threaded through the vibration sensor, and coupled to the driver such that the vibration sensor support is rotatable around a longitudinal axis of the driver shaft and slidable along a longitudinal portion of the driver shaft.

The vibration sensor support may include a helmet to receive the vibration sensor, the helmet including a helmet floor to contact a back surface of the vibration sensor, a helmet side portion to support at least a portion of the perimeter surface of the vibration sensor, and a helmet recess in the helmet floor to accommodate the attachment screw.

The helmet recess may extend to the helmet side portion to accommodate a data cable of the vibration sensor.

The vibration sensor support may further include first and second connector plates spaced away from the helmet by a plurality of connector pins, the first and second connector plates configured to receive the driver shaft through respective central openings thereof, the central openings being sized such that the first and second connector plates are rotatable about the driver shaft and slidable along the longitudinal portion of the driver shaft.

The device may further include a stopper member provided to the driver shaft between the first and second connector plates to maintain a central portion of the driver shaft between the first and second connector plates.

The device may further include a resilient member between the stopper member and the first or second connector plate to bias the driver in the direction of the helmet.

The resilient member may be a spring through which at least a portion of the driver shaft passes.

The driver may be biased toward the vibration sensor support.

The device may further include one or more spacers between the handle portion and the vibration sensor support to allow rotation without contact between the handle portion and the vibration sensor support.

The one or more spacers may be one or more washers provided about the driver shaft.

The device may further include a recess provided to corresponding outer portions of the first and second connector plates to accommodate a data cable of the vibration sensor.

The device may further include at least one pair of corresponding grip recesses respectively provided to the first and second connector plates.

The device may further include an illuminating device coupled to the vibration sensor support.

The device may further include an accommodating portion in the vibration sensor support in which the illuminating device is removably coupled.

The illuminating device may be removably coupled to the vibration sensor support by at least one securing strap.

The at least one securing strap may be an elastic strap.

The foregoing and/or other aspects and advantages of the present general inventive concept may also be achieved by a system to store and/or transport a sensor mounting device supporting a vibration sensor, the system including a handheld device to secure a vibration sensor to a mounting pad, the device including a driver having a handle portion and a driver shaft extending therefrom, the driver shaft having a driver portion at a distal end, and a vibration sensor support configured to support the vibration sensor such that the driver portion has access to an attachment screw threaded through the vibration sensor, and coupled to the driver such that the vibration sensor support is rotatable around a longitudinal axis of the driver shaft and slidable along a longitudinal portion of the driver shaft, and a carrier to accommodate the handheld device while the handheld device supports the vibration sensor.

The system may further include a belt coupled to the carrier.

The carrier may enclose a substantial portion of the vibration sensor support.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which.

DETAILED DESCRIPTION

Reference will now be made to various example embodiments of the present general inventive concept, examples of which are illustrated in the accompanying drawings and illustrations. The example embodiments described herein are presented in order to explain the present general inventive concept by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The described progression of processing operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

Figure 3A:
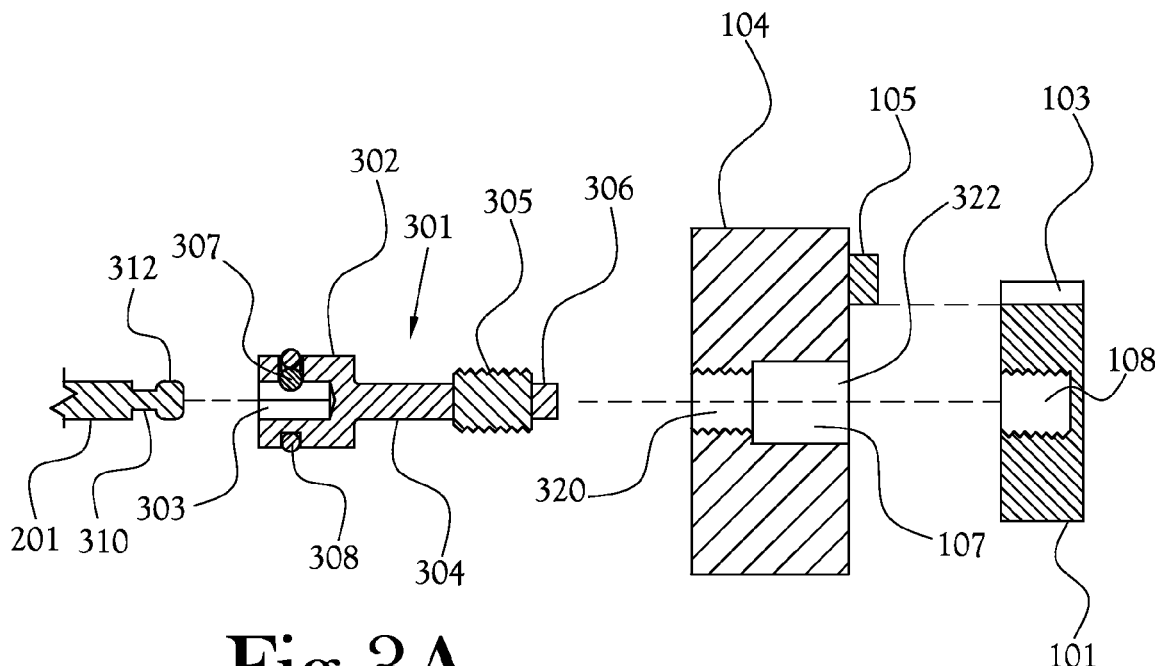
FIGS. 3A-3H illustrate example embodiments of an attachment screw that is used to secure a vibration sensor to a mounting pad according to the present general inventive concept, as well as a conventional attachment screw for comparison.

FIGS. 3A-3H illustrate example embodiments of an attachment screw that is used to secure a vibration sensor 104 to a mounting pad 101 according to the present general inventive concept, as well as a conventional attachment screw for comparison. Although a triaxial accelerometer is illustrated in these drawings, the accelerometer is referred to as a vibration sensor, as a variety of vibration sensors may be incorporated in various embodiments of the present general inventive concept. As illustrated in FIG. 3A, the attachment screw 301 includes a head portion 302 having a recessed socket 303 to receive a hex key of a hex driver 201, a first unthreaded section 304 extending from the head portion 302, a threaded section 305 extending from the first unthreaded section 304, and a second unthreaded section 306 extending from the threaded section 305. A detent 307 is provided at a side of the recessed socket 303 at a location to correspond to a hex cavity 310 of a ball-end hex key 312. A resilient member 308 biases the detent 307 inwardly toward the radial center of the recessed socket 303.

Figure 3B:
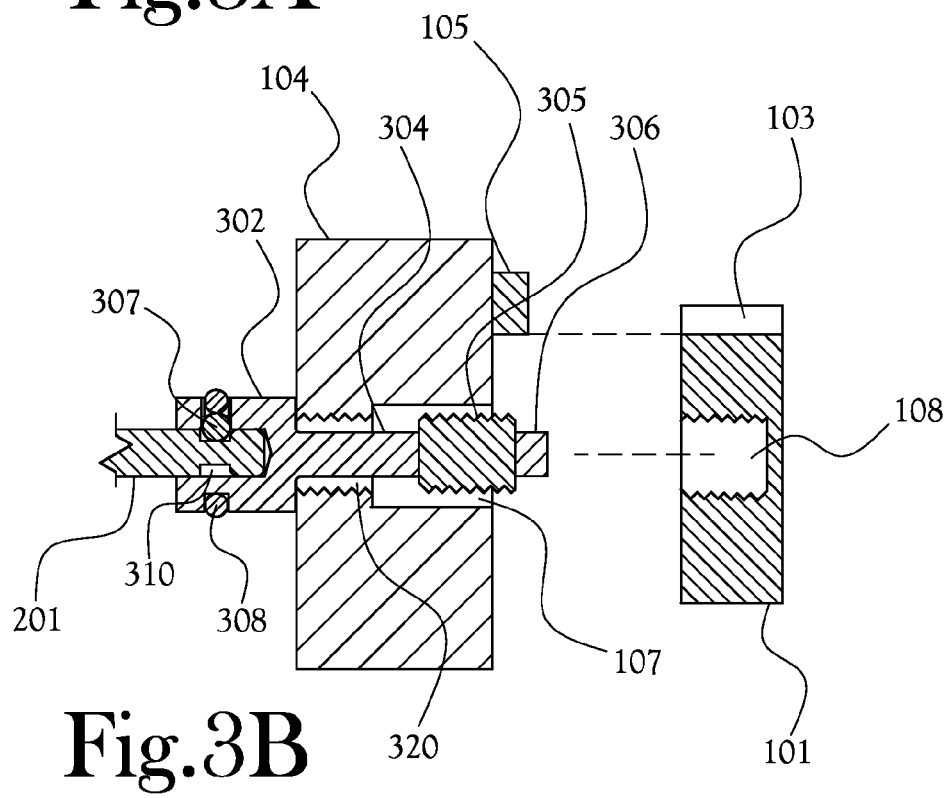
Figure 3C:
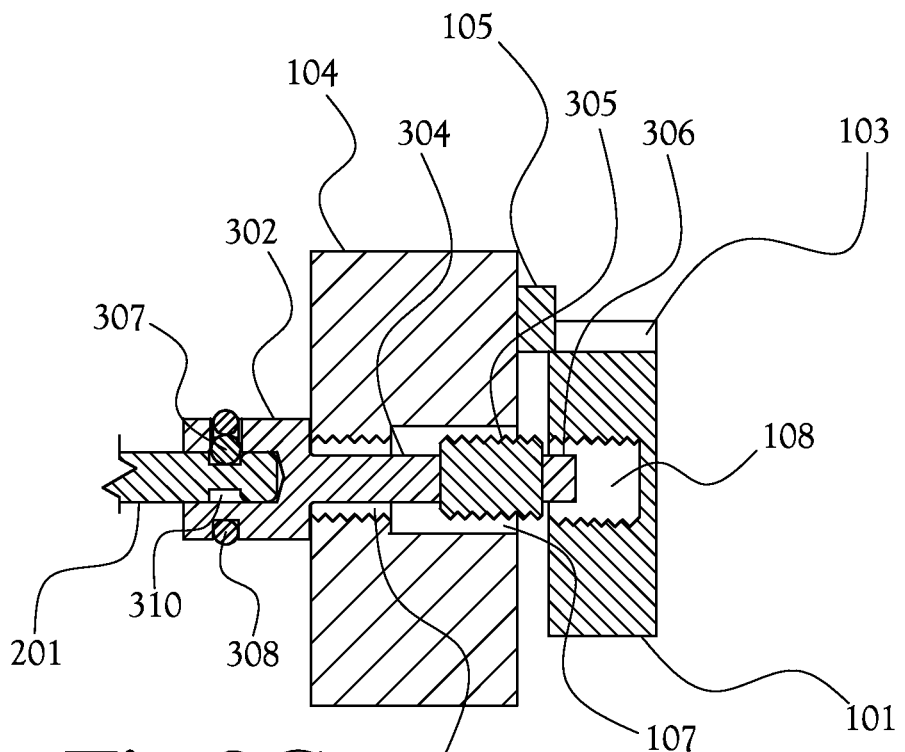

As illustrated in FIG. 3B, when the attachment screw 301 according to this example embodiment of the present general inventive concept is moved fully through the through hole 107 such that the head portion 302 is in contact with a surface of the vibration sensor 104, the first unthreaded section 301 is configured so as to extend at least partially out of the threaded portion 320 of the through hole 107 and into the unthreaded portion 322 of the through hole 107. The second unthreaded section 306, which extends from the distal end of the threaded section 305 of the attachment screw 301, is configured to extend further from the mounting side of the vibration sensor 104, i.e., the side of the vibration sensor that faces the mounting pad 101, than does the alignment pin 105, and acts as a pilot to assist in the guidance of the attachment screw 301 into the receiving aperture 108 of the mounting pad 101. Also, the threaded section 305 of the attachment screw 301 is configured such that the distal end of the threaded section 305 does not extend as far from the mounting side of the vibration sensor 104 as the alignment pin 105. In other words, the threaded section 305 of the attachment screw 301 is not able to reach the mounting pad 101 before the alignment pin 105 contacts the mounting pad 101 at an area other than the alignment recess 103. With such a configuration, the distal end of the alignment pin 105 extends further than the threaded section 305 of the attachment screw, and is able to mate with the alignment recess 103 before any threads of the threaded section 305 are engaged with the receiving aperture 108. Thus, as illustrated in FIG. 3C, both the pilot section, i.e. second unthreaded section 306, of the attachment screw 301 and the alignment pin 105 are able to be engaged respectively with the receiving aperture 108 and alignment recess 103 of the mounting pad 101 before the threads of the threaded section 305 of the attachment screw 301 are engaged with the receiving aperture 108 of the mounting pad 101.

As also illustrated in FIG. 3B, the detent 307 is positioned so as to be accommodated by the hex cavity 310 of the ball-end hex key 312. The force provided by the biased detent 307 acts to retain the ball-end hex key 312 inside the recessed socket 303. The detent 307 is biased to the extent that an assembly of the attachment screw 301 and the vibration sensor 104 can be retained on the ball-end hex key 312 without the user having to hold the attachment screw 301 or vibration sensor 104. This was heretofore quite challenging given the weight of the vibration sensor. Similarly, the detent 307 is biased to the extent that a conventional ball-end hex driver can be retained in place in the recessed socket 303 even when a user removes his/her hand from the driver 201, but is easily removed when the user applies force in a direction to extract the driver 201 from the attachment screw 301. The resilient member 308 which biases the detent 307 may be, for example an elastic band that is provided around an outer diameter of the head portion 302. An example embodiment of the detent 307 and resilient member 308 will be discussed in more detail in the description of FIG. 4.

As described above, the force applied to the hex cavity 310 of the driver 201 by the biased detent 307 allows the detent 307 to releasably retain the driver 201 such that the user may release his/her grip of the vibration sensor 104 and simply use the one hand that is gripping the driver 201 to hold and support all of the driver 201, attachment screw 301, and vibration sensor 104. The vibration sensor 104 is retained on the attachment screw 301 due to the threaded portion 320 of the through hole 107 being located between the head portion 302 and the threaded section 305 of the attachment screw 301, and the attachment screw 301 is retained on the ball-end hex key 312 by the biased detent 307. As such, the user can use one hand to both guide the vibration sensor 104 to the mounting pad 101, and turn the driver 201 to secure the vibration sensor 104 to the mounting pad 101. Also, although not illustrated, the attachment screw 301 may be provided with a frictional element which will provide enough friction to turn the unsecured vibration sensor 104 via the ball-end hex key 312 for proper alignment with the mounting pad, but not so much friction as to impede the turning of the attachment screw 301 once the alignment pin 105 is located in the alignment recess 103. In other words, a frictional element, such as, for example, a polymer coating, could be provided to at least a portion of the attachment screw 103 to provide a limited grip of the vibration sensor 104 by the attachment screw 103. In various example embodiments, such a frictional element may be provided only along a portion of the first unthreaded section 304, which is configured to have the most contact with the vibration sensor 104 when the attachment screw 301 is positioned inside the vibration sensor 104.

Figure 3D:
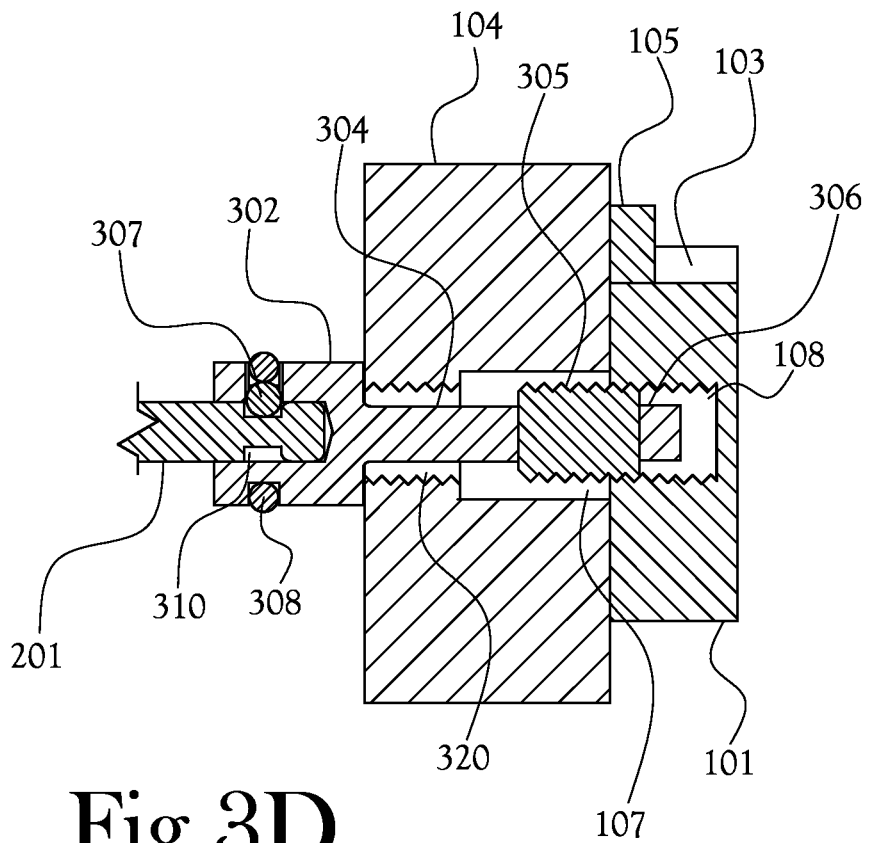

FIG. 3D illustrates the vibration sensor 104 mounted securely on the mounting pad 101. As illustrated in the drawing, the face of the vibration sensor 104 is in contact with the mounting pad 101, the alignment pin 105 is received in the alignment recess 103, and the attachment screw 301 has been driven such that the head portion 302 is in contact with the back of the vibration sensor 104. Upon securing the vibration sensor 104 upon the mounting pad 101 as shown in the drawing, the user is able to remove the driver 201 by simply applying force to overcome the force applied to the hex cavity 310 through the detent 307.

Figure 3E:
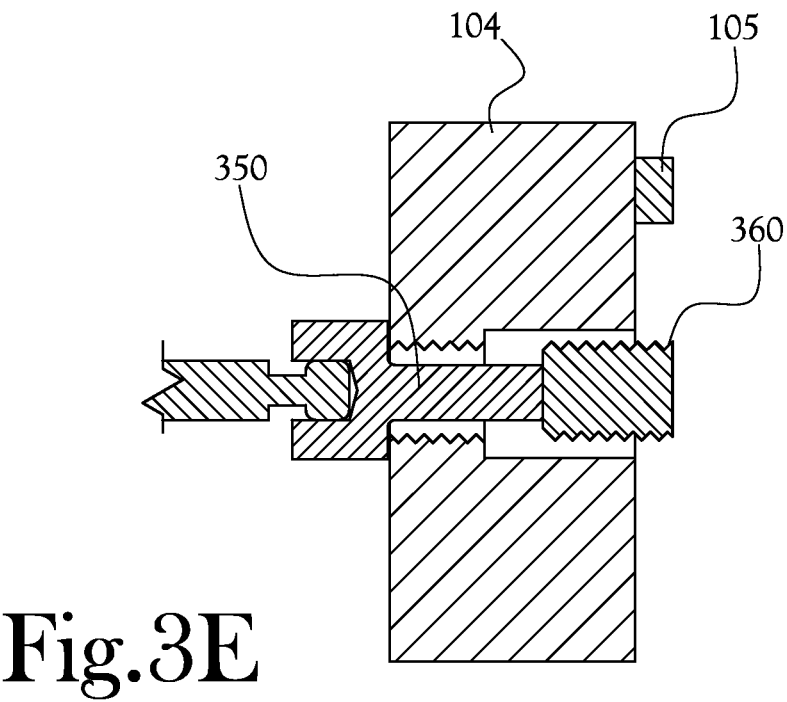

FIG. 3E illustrates a vibration sensor 104 that is coupled using a conventional attachment screw 350. As illustrated in FIG. 3, the conventional attachment screw 350 has no pilot section to assist in guiding the conventional attachment screw 250 to the receiving aperture 108 of the mounting pad 101, which increases the inconvenience of the operator. Also, the threaded section 360 of the conventional attachment screw 350 extends approximately the same distance from the mounting surface of the vibration sensor 104 as does the alignment pin 105, which may cause the sensor to twist away from the mounting pad 101 in an undesirable fashion if a one-hand operation is attempted.

Figure 3F:
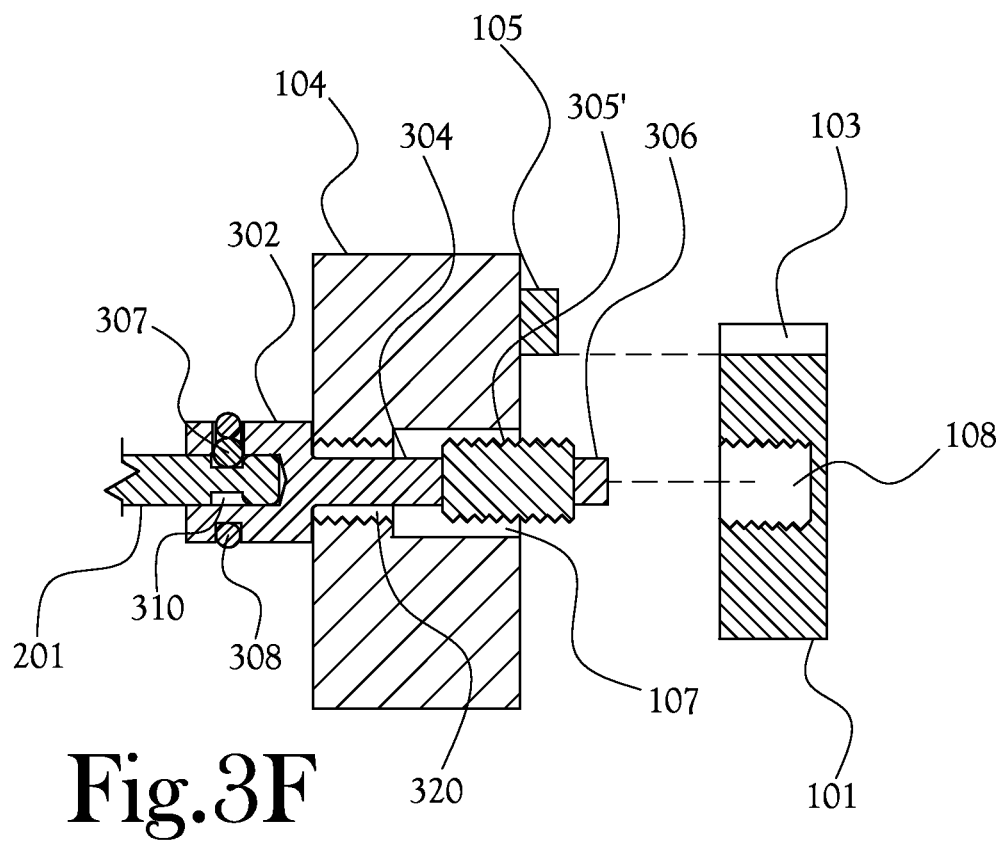

Another example embodiment of the present general inventive concept is illustrated in FIG. 3F, in which the threaded section 305' is configured to extend farther from the mounting side of the vibration sensor 104 than the alignment pin 105. As illustrated in FIG. 3F, when the attachment screw 301 according to this example embodiment of the present general inventive concept is moved fully through the through hole 107 such that the head portion 302 is in contact with a surface of the vibration sensor 104, the first unthreaded section 301 is configured so as to extend at least partially out of the threaded portion 320 of the through hole 107 and into the unthreaded portion 322 of the through hole 107. Also, the threaded section 305' of the attachment screw 301 is configured such that the distal end of the threaded section 305' extends further from the mounting side of the vibration sensor 104 than the alignment pin 105. In other words, the threaded section 305' of the attachment screw 301 is able to reach the mounting pad 101 before the alignment pin 105 contacts the mounting pad 101. As with the example embodiment described in FIGS. 3A-D, the second unthreaded section 306, which extends from the distal end of the threaded section 305' of the attachment screw 301, acts as a pilot to assist in the guidance of the attachment screw 301 into the receiving aperture 108 of the mounting pad 101.

Figure 3G:
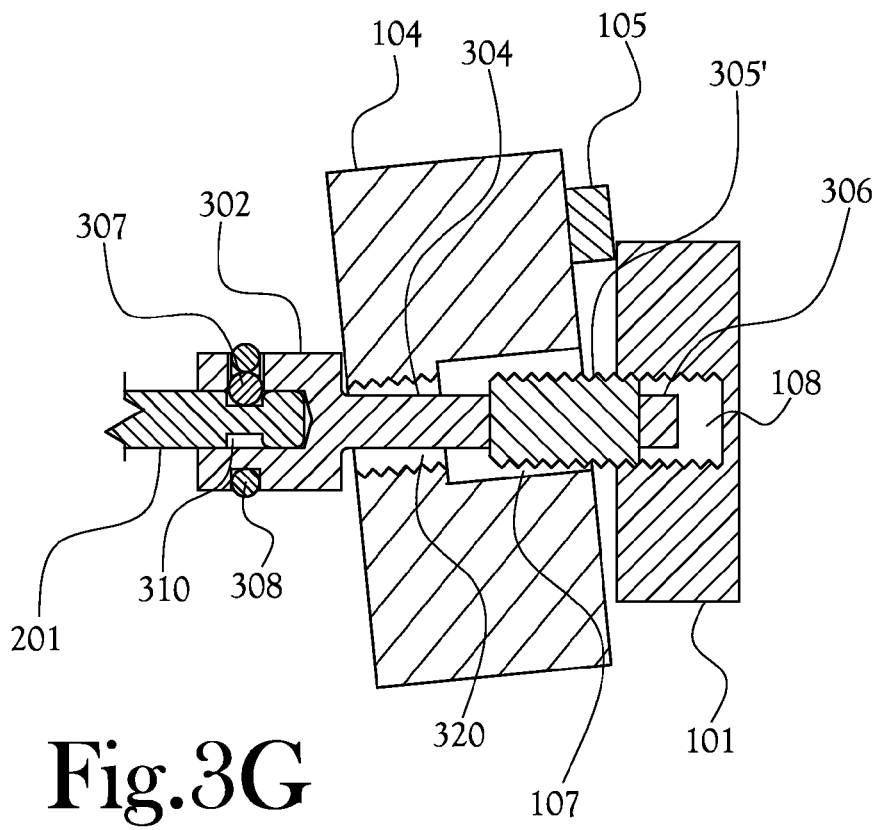

As illustrated in FIG. 3G, once the threaded section 305' of the attachment screw 301 has been driven through the threaded portion 320 of the vibration sensor 104, the first unthreaded section 304 of the attachment screw 301 is located inside the threaded portion 320 of the vibration sensor 104. As a result, the vibration sensor 104 is able to rotate freely around the attachment screw 301. Also, the vibration sensor 104 has limited lateral and longitudinal movement relative to the attachment screw 301 which allows a multi-directional floating action to assist in the mounting of the vibration sensor 104 on the mounting pad 101. In some situations, the user will be afforded enough sufficient room for movement and visible area that the user can, with one hand holding the driver 201 to which the assembly of the attachment screw 301 and vibration sensor 104 are releasably retained, guide the alignment pin 105 of the vibration sensor 104 directly to the alignment recess 103 of the mounting pad 101, and then simply rotate the driver 201 to drive the attachment screw 301 until the vibration sensor 104 is fixed to the mounting pad 101. However, in a situation in which mobility and/or sight may be limited, the user is able to hold the driver 201, to which the assembly of the attachment screw 301 and vibration sensor 104 are releasably retained, and guide the attachment screw 301 to the receiving aperture 108 and drive the attachment screw 301 just enough to hold attachment screw 301 in place while the user removes his/her hand from the driver 201 and rotates the vibration sensor 104 until the alignment pin 105 is aligned with the alignment recess 103 of the mounting pad 101. In such a situation, the second unthreaded section 306, due to being of smaller diameter than the threaded receiving aperture 108 of the mounting pad 101, is able to be used as a pilot assist the user in guiding the attachment screw 301 into receiving aperture 108. Also, because the second unthreaded section 306 has the limited floating action discussed above relative to the vibration sensor 104, the second unthreaded section 306 is able to be guided into the receiving aperture 108, and the attachment screw 301 is able to be driven enough to engage the threaded section 305' with the threaded receiving aperture 108, even when the alignment pin 105 is abutted against a portion of the mounting pad 101 other than the alignment recess 103. Such a situation is illustrated in FIG. 3G, which shows the attachment screw 301 engaging the threaded receiving aperture 108 of the mounting pad 101 while the vibration sensor 104 is misaligned in a rotational sense. After a portion of the threaded section 305' is engaged with the threaded receiving aperture 108, as shown in FIG. 3G, the user is able to remove his/her hand from the driver to rotate the vibration sensor 104 until the alignment pin 105 is aligned with the alignment recess 103 of the mounting pad 101. The engagement of the driver 201 with the attachment screw 301 is maintained by the interaction of the detent 307 with the hex cavity 310 of the ball-end hex key 312 while the user is rotating the vibration sensor 104 to the proper alignment.

Figure 3H:
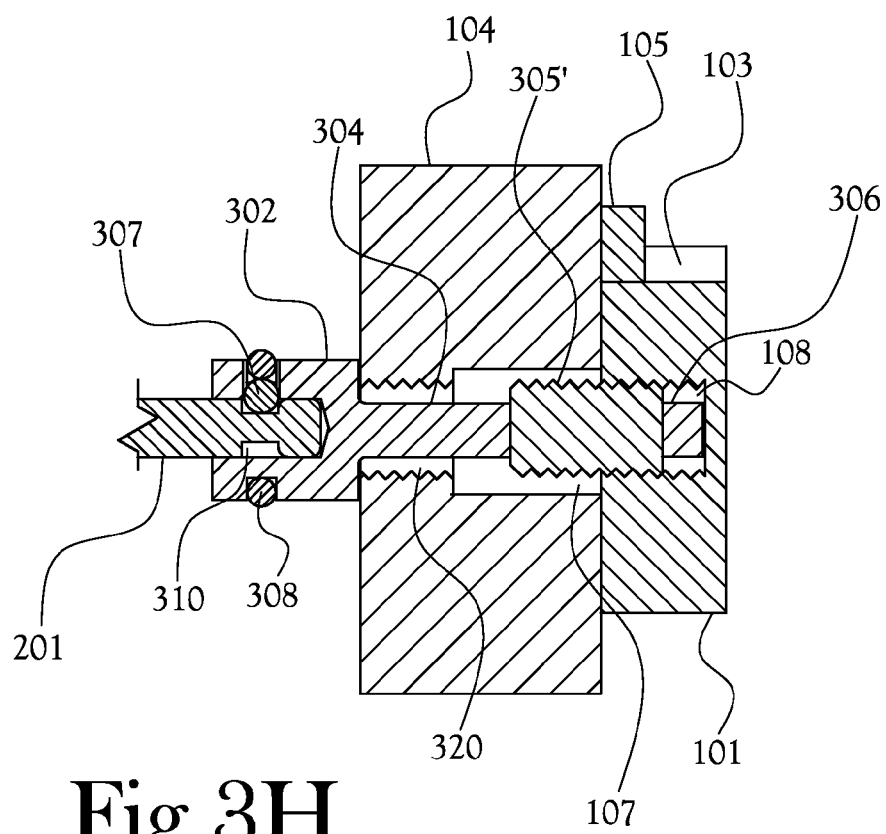

FIG. 3H illustrates the vibration sensor 104 of FIG. 3G mounted securely on the mounting pad 101. As shown in the drawing, the face of the vibration sensor 104 is in contact with the mounting pad 101, the alignment pin 105 is received in the alignment recess 103, and the attachment screw 301 has been driven such that the head portion 302 is in contact with the back of the vibration sensor 104. Upon securing the vibration sensor 104 upon the mounting pad 101 as shown in the drawing, the user is able to remove the driver 201 by simply applying force to overcome the force applied to the hex cavity 310 through the detent 307.

Figure 1:
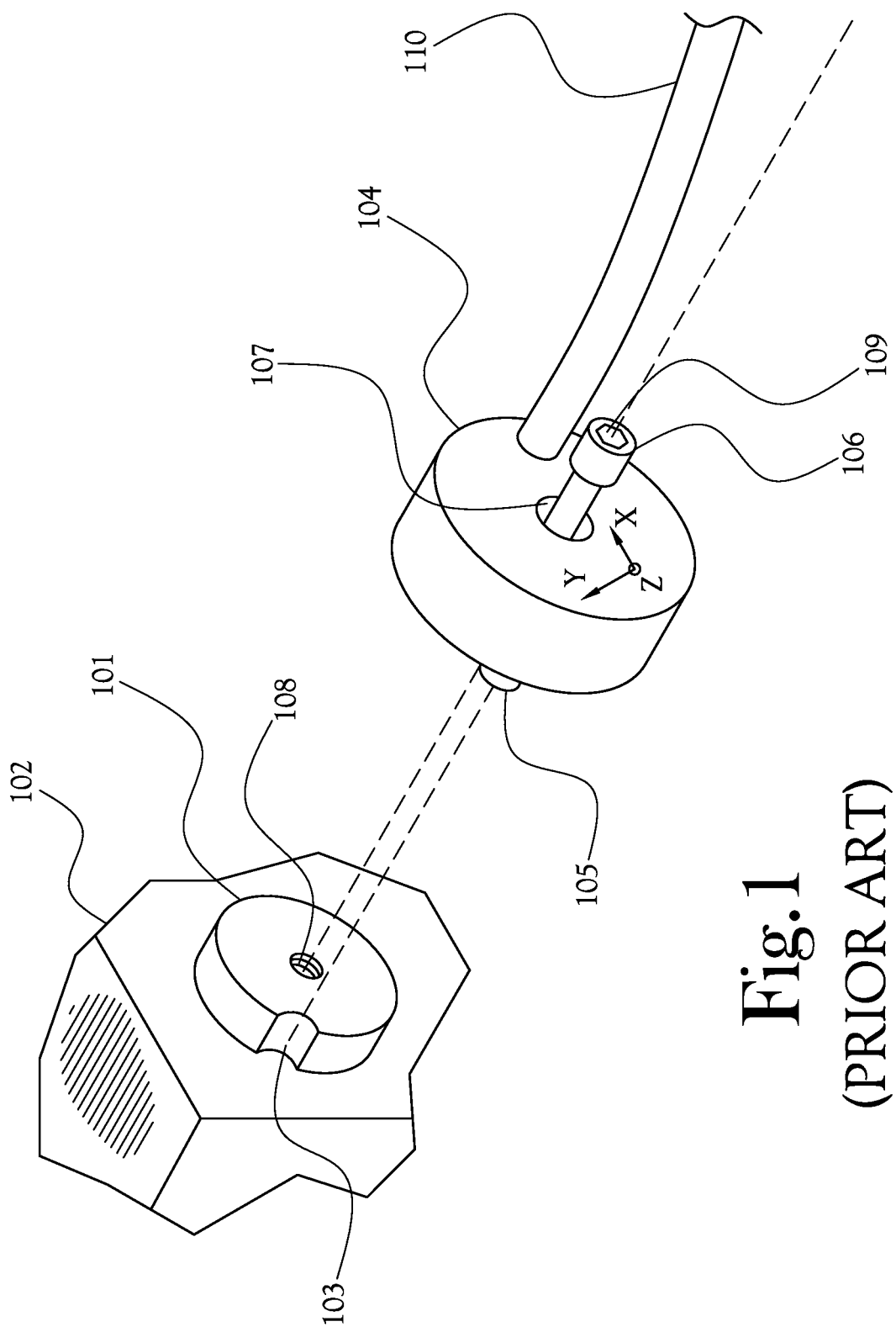
FIG. 1 illustrates a conventional triaxial accelerometer and mounting pad used in a vibration measurement.
Figure 2:
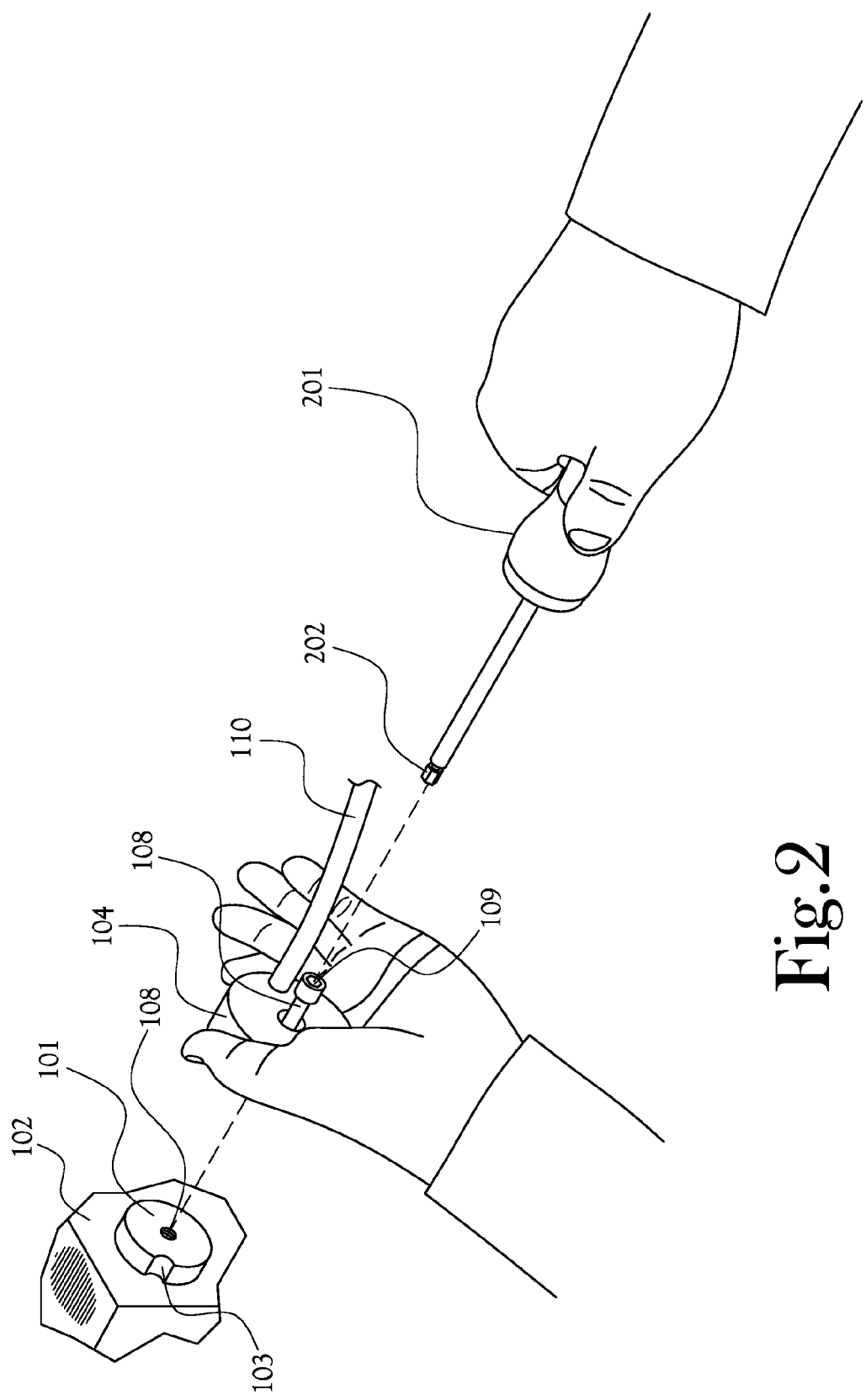
FIG. 2 illustrates a conventional method of mounting the vibration sensor onto the mounting pad.

While the data cable 110 illustrated in FIGS. 1 and 2 is not illustrated in FIGS. 3A-3D, as well as various other drawings described herein, it is understood that the various example embodiments discussed in regard to these drawings may be used with vibration sensors 104 that include such a data cable 110, vibration sensors 104 that transmit vibration data wirelessly, or other such configurations. Therefore, various drawings may include vibration sensors 104 with or without the data cable 110, but the present general inventive concept is not limited to the presence or lack of the data cable 110.

Figure 4:
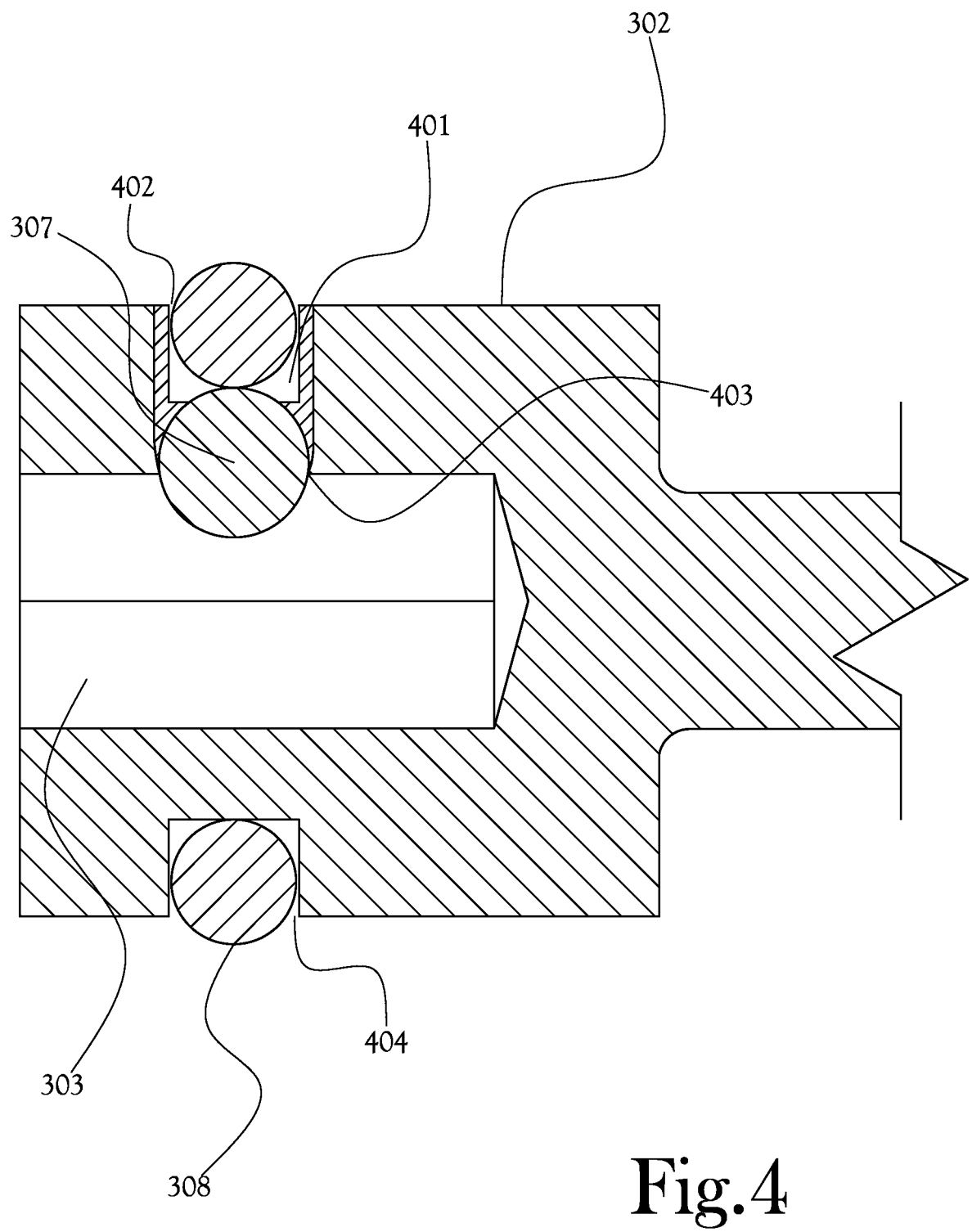
FIG. 4 illustrates a more detailed view of a head portion of the attachment screw illustrated in FIGS. 3A-3D and 3F-3H, according to an example embodiment of the present general inventive concept.

FIG. 4 illustrates a more detailed view of the head portion 302 of the attachment screw 301 illustrated in FIGS. 3A-3D and 3F-3H, according to an example embodiment of the present general inventive concept. In the example embodiment of FIG. 4, a recess is provided in an outer wall of the head portion 302 of the attachment screw 301 to accommodate the detent 307. The detent 307 of this example embodiment has the shape of a round ball, and the diameter of the recess 401 is slightly larger than the diameter of the detent 307 so as to facilitate movement of the detent 307 in a radial motion relative to the recessed socket 303, but also limit movement of the detent 307 that is substantially orthogonal to the radial motion. It is understood that this configuration is simply an example, and other shapes and configurations of the detent 307 and recess 401 may be used. Also, various other types of detents and corresponding biasing elements, other than those described in relation to this example embodiment, may be used.

As illustrated in FIG. 4, the recess 401 includes a first opening 402 at the outer diameter of the head portion 302, and a corresponding second opening 403 at a surface of the recessed socket 303. The second opening 403 is tapered to support the detent 307 such that only a portion of the detent 307 is able to extend through the second opening 403. The portion of the detent 307 which extends through the second opening 403 provides force to the hex cavity 310 of a ball-end hex key 312 when such a driver 201 is engaged with the attachment screw 301. The resilient member 308 biases the detent 307 so as to provide a force in the direction of the hex cavity 310, and allows limited movement in the opposite direction. In this example embodiment, the resilient member 308 is an elastic band that is provided around the head portion 302. The head portion 302 is configured to have a groove 404 which receives the elastic band, or resilient member 308, and the recess 401 passes through the groove 404 such that the resilient member 308 is located above and in contact with the detent 307. In various example embodiments, a polyurethane o-ring is used as the resilient member 308. It is understood that the elastic band described above is merely one example of a resilient member 308 which provides bias and support to the detent 307. For example, various example embodiments of the present general inventive concept may have a recess that does not have a first opening 402 in the outer diameter of the head portion 302, but rather have an entirely contained resilient member 308 inside the recess above the detent 307.

Figure 5:
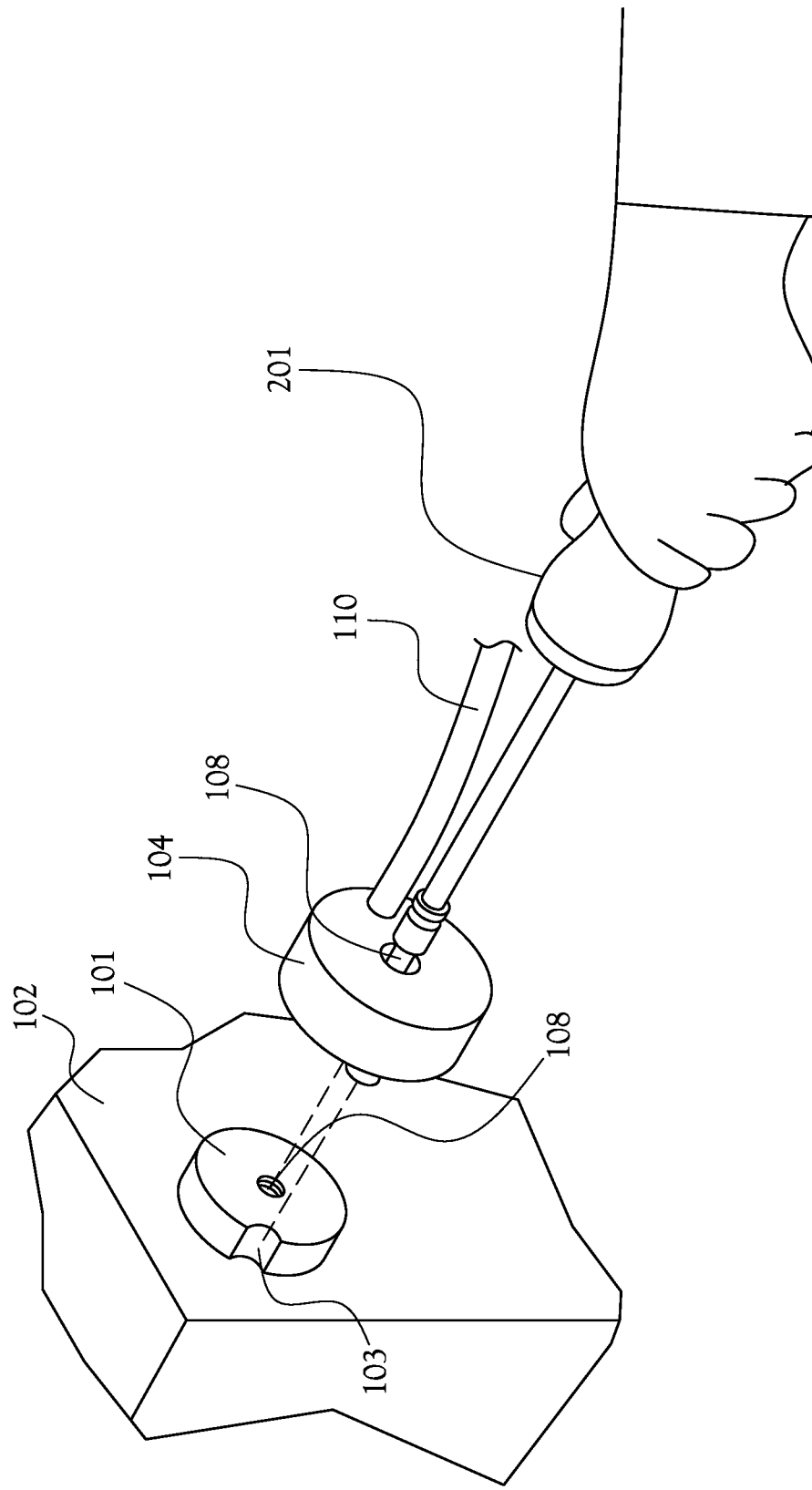
FIG. 5 illustrates an example of a vibration sensor mounting operation using an attachment screw according to an example embodiment of the present general inventive concept.

FIG. 5 illustrates an example of a vibration sensor mounting operation using an attachment screw 301 according to an example embodiment of the present general inventive concept. As illustrated in FIG. 5, a user is able to guide the vibration sensor 104 to the mounting pad 101 using only one hand, due to the assembly of the vibration sensor 104 and attachment screw 301 being releasably retained on the ball-end hex key 312 of the driver 201. Once the threaded section 305 of the attachment screw 301 is engaged with the threaded receiving aperture 108 of the mounting pad 101, the user can simply continue to rotate the driver to secure the vibration sensor 104 to the mounting pad 101. Since the detent 307 is being biased toward the hex cavity 310, and therefore the ball-end hex key 312 is being releasably retained inside the hex cavity 310, the user is able to remove his/her hand to assist in the driving motion. After the vibration sensor 104 has been secured to the mounting pad 101, the user may simply apply force by pulling the driver away from the vibration sensor 104, and the pulling force will overcome the retaining force transferred by the detent 307 such that the driver 201 will be release.

Figure 6:
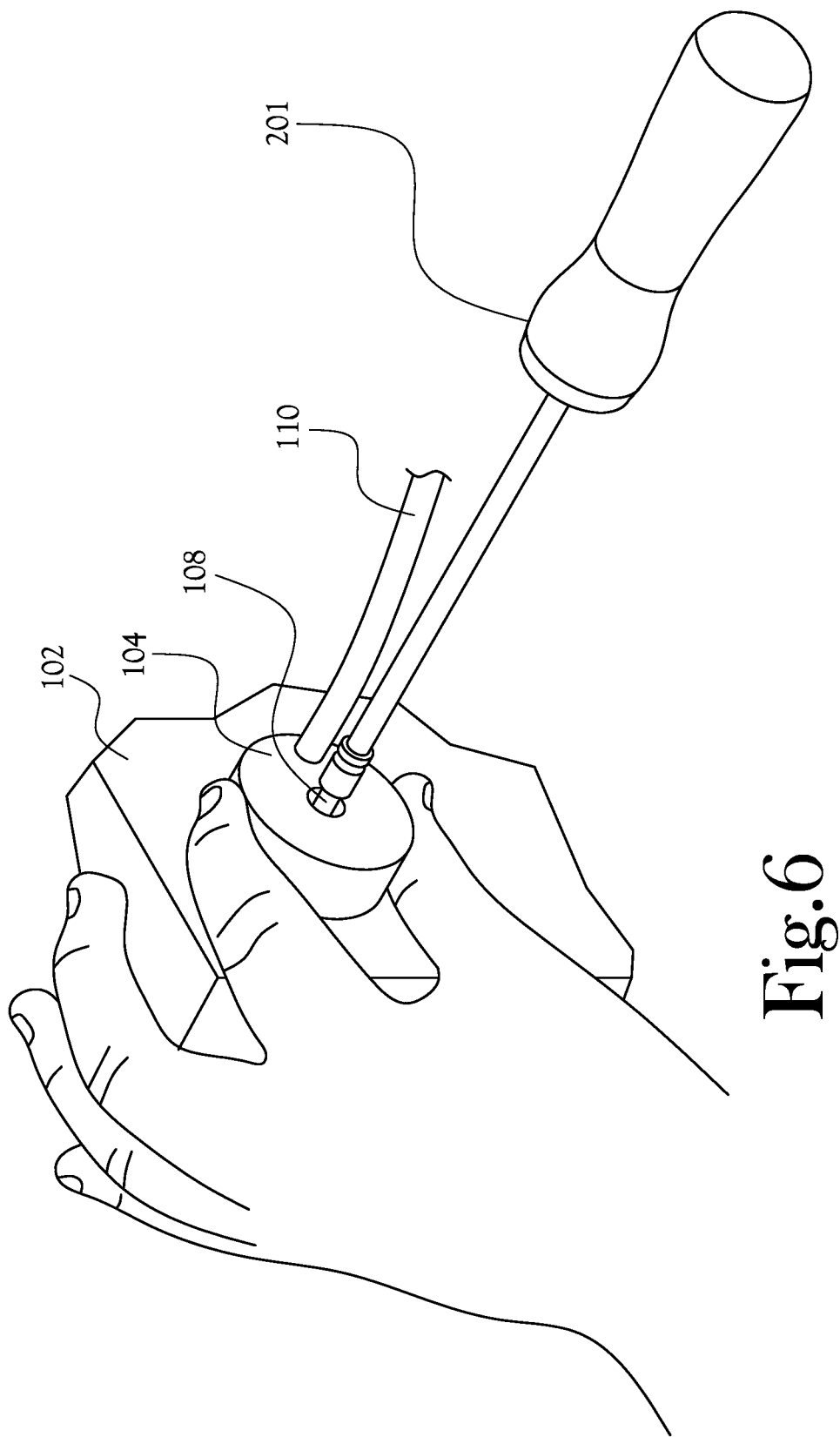
FIG. 6 illustrates an example of another vibration sensor mounting operation using the attachment screw of FIGS. 3F-H.

FIG. 6 illustrates an example of another vibration sensor mounting operation using the attachment screw 301 having the threaded section 305' illustrated in FIGS. 3F-H. In this example, the user has encountered a situation that inhibits being able to guide the alignment pin 105 of the vibration sensor 104 directly to the alignment recess 103 of the mounting pad 101, and therefore has simply used the second threaded section 306 of the attachment screw 301 to pilot the threaded section 305' into the threaded receiving aperture 108 of the mounting pad 101, resulting in an alignment similar to that illustrated in FIG. 3G. Therefore, as the driver 201 is releasably retained by the attachment screw 301, the user is able to release the grip of the driver 201 and use that hand to rotate the vibration sensor 104 to the proper orientation according to the alignment pin 105 and alignment recess 103. After such alignment, the user is able to move the one hand back to the driver 201 and continue the mounting operation.

Various example embodiments of the present general inventive concept discussed in the descriptions of FIGS. 3A-6 provide an apparatus with which a user may conveniently mount a vibration sensor using only one hand. In some environments, extra support and protection may be achieved by providing a sensor support to the driver itself, the sensor support providing protection to at least partial surfaces of the vibration sensor, and providing more ways to rotate the vibration sensor to the proper orientation. Various sensor mounting devices incorporating such a sensor support according to examples of the present general inventive concept are discussed in the descriptions of FIGS. 7-9.

Figure 7:
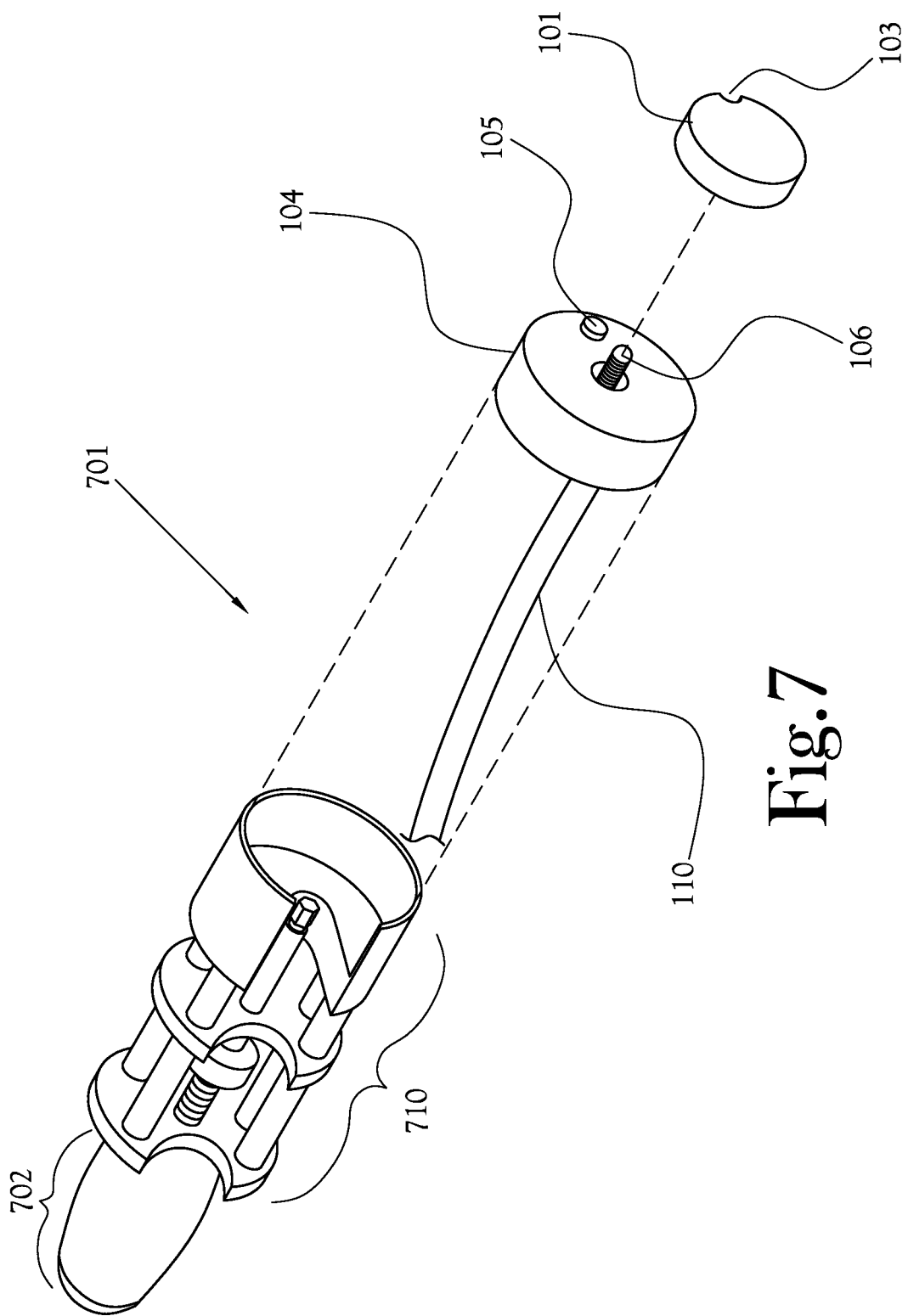
FIG. 7 illustrates a one-hand operable sensor mounting device according to an example embodiment of the present general inventive concept.

FIG. 7 illustrates a one-hand operable sensor mounting device according to an example embodiment of the present general inventive concept. The sensor mounting device 701 includes a sensor support 710 that is coupled to a driver 702 to support and protect the vibration sensor 104 during a mounting of the vibration sensor 104 onto the mounting pad 101. The coupling of the sensor support 710 to the driver 702 allows the sensor support 710 to rotate around the longitudinal axis of the driver 702, and also allows the sensor support 710 to move back and forth along a limited distance in the longitudinal direction of the driver 702. The sensor support 710 is configured to receive the vibration sensor 104 at a distal end thereof, to hold and protect at least portions of the surface area of the vibration sensor 104, while the user guides the vibration sensor 104 to the mounting pad 101. Once the vibration sensor 104 has reached the mounting pad 101, the user can rotate the sensor support 101 until the alignment pin 105 of the vibration sensor 104 is received in the alignment recess 103 of the mounting pad 101, using the same hand that is gripping the driver 702. The attachment screw 106 can be engaged with the threaded receiving aperture 108 of the mounting pad 101 before the aligning of the alignment pin 105, or the alignment operation can be carried out before any threading of the attachment screw 106, since the driver 702 is able to move in a longitudinal direction relative to the sensor support 710, and thus supports longitudinal movement of the attachment screw 106 relative to the vibration sensor 106. Also, though not illustrated in these drawings, the driver 702 could be provided with a motorized driving mechanism to aid the user in the driving of the attachment screw 301. Such a motorized driving mechanism could be integrated with the sensor support 701, and may allow such a motorized operation with a touch of a button also integrated with the sensor support 701.

Figure 8:
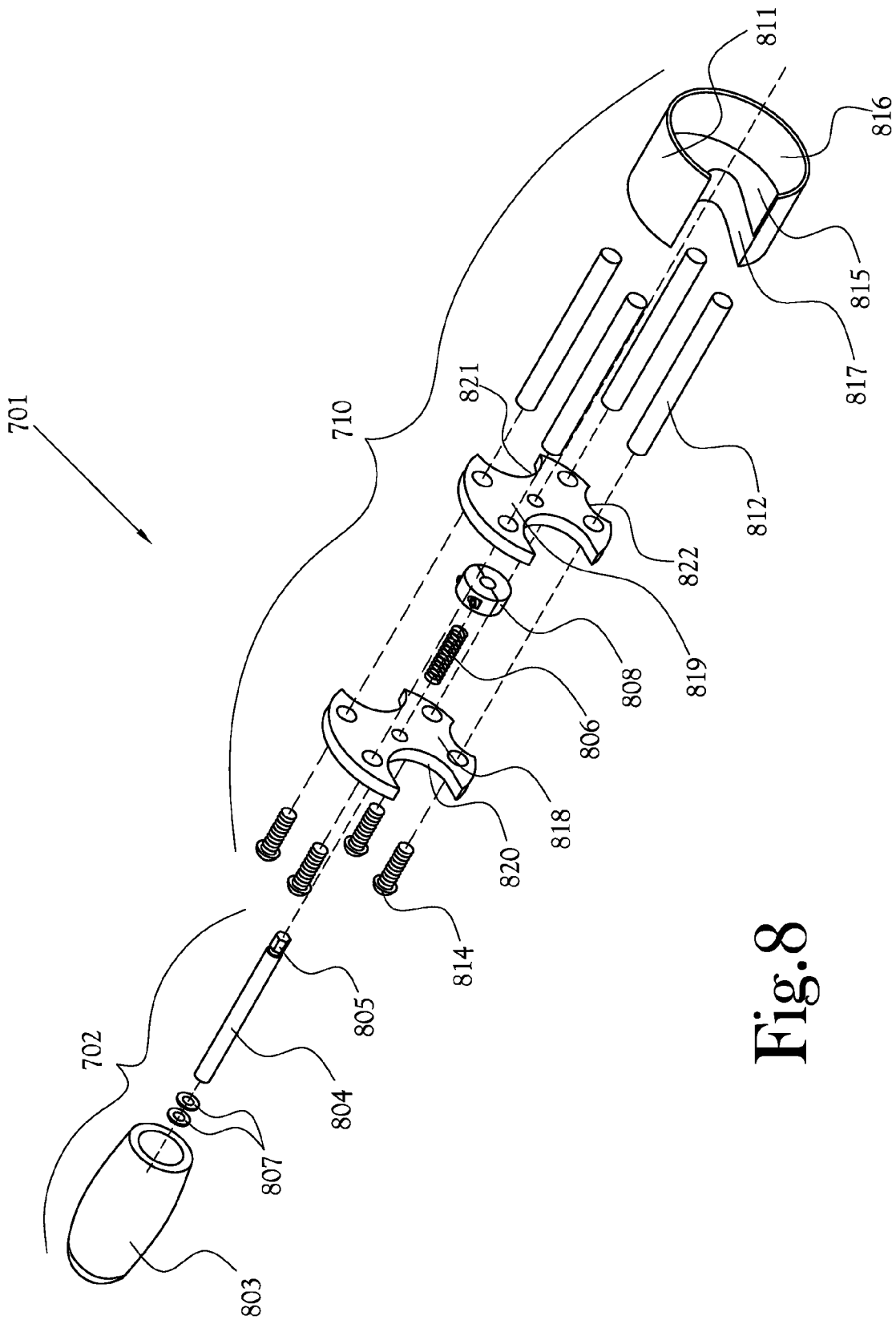
FIG. 8 illustrates an exploded view of the sensor mounting device 701 of FIG. 7, according to an example embodiment of the present general inventive concept.

FIG. 8 illustrates an exploded view of the sensor mounting device 701 of FIG. 7, according to an example embodiment of the present general inventive concept. It is understood that the various elements and configuration of these elements illustrated in these drawings are merely examples of elements that may be included in the sensor mounting device. Inclusion of various additional elements, omission of various illustrated elements, and/or substitution of the illustrated elements may be envisioned by those skilled in the art in other various example embodiments of the present general inventive concept. In the example illustrated in FIG. 8, the driver 702 includes a handle 803 coupled to a driver shaft 804 extending from the handle 803. The driver shaft 804 may have a hex key 805 at a distal end thereof to enter the recessed socket 303 of the attachment screw 301. The hex key 805 may be the ball-end hex key 312 described in regard to FIGS. 3A-3D, but other type of hex key, as well as other types of driver types in general, may be provided to the driver. Also, while the description of the various example embodiments of FIGS. 7-9 may describe the inclusion of the previously described attachment screw 301 to fix the sensor 104 to the mounting pad 101, it is understood that other attachment screws may also be used with the sensor mounting device 701. In other words, it is not necessary that an attachment screw with the configuration and elements described in FIGS. 3A-3D be used with a vibration sensor 104 mounted by the sensor mounting device 701.

The sensor support includes a helmet 811 configured to receive the vibration sensor 104. The helmet 811 includes a helmet floor 815 which is contacted by the vibration sensor 104 when the vibration sensor 104 is accommodated in the helmet 811. A side portion of the helmet 811 extends from the helmet floor 815 to provide lateral support for the vibration sensor, as well as protection from contact with various other objects during the mounting process. While the helmet 811 of this example is illustrated as having a side portion 816 that substantially surrounds the peripheral edge of the vibration sensor 104, other various example embodiments may cover/contact more or less of the surface area of the vibration sensor 104. For example, discontinuous side portions may extend from the helmet floor 815 at three or more points to provide the support and protection for the vibration sensor 104.

The helmet 811 of this example embodiment includes a helmet recess 817 to accommodate the attachment screw 301 provided to the vibration sensor 104 and the data cable 110 of the vibration sensor 104 in the event that such a data cable 110 is present. In other words, in this example embodiment, the helmet recess 817 is provided in portions of the helmet floor 815 and the side portion 816. With the configuration of the helmet recess 817 illustrated in FIG. 8, it is apparent that the vibration sensor 104 may be securely supported in the helmet 811 whether the data cable 110 is present or not.

The sensor support 710 of this example embodiment includes four connector pins 812 coupled to the helmet 811 so as to extend from a surface opposite to the helmet floor 815. The connector pins 812 may be coupled to the helmet 811 by a variety of different methods, such as by an adhesive, welding, etc. The ends of the connector pins 812 opposite to the ends coupled to the helmet 811 are coupled to a first connector plate 818. Again, the connector pins 812 may be coupled to the first connector plate 818 by a variety of different methods. In the example embodiment of FIG. 8, the connector pins 812 are fixed to the first connector plate 818 by a plurality of respective screws 814 that pass through corresponding holes in the first connector plate 818 and into ends of the connector pins 812. A second connector plate 819, through which the connector pins 812 pass via through holes, is fixed to the connector pins 812 between the helmet 811 and the first connector plate 818. The configuration of the helmet 811, connector pins 812, first connector plate 818, and second connector plate 819 provide the basic structure of the sensor support 710.

In the example embodiment illustrated in FIG. 8, the first and second connector plates 818,819 are provided with cable recess 820 to accommodate the data cable 110 which extends from the vibration sensor 104. The cable recess 820 corresponds to the helmet recess 817 of sensor support 710, which also accommodates the data cable 110 in situations in which the data cable 110 is present. It is understood that vibrations sensors that do not employ such a data cable are still suitably supported and protected by the sensor mounting device 701.

As previously discussed, the sensor support 710 is rotatable about the longitudinal axis of the driver 702 so that the alignment pin 105 of the vibration sensor 104 may be aligned with the alignment recess 103 of the mounting pad 101. The user may use one or more fingers to perform such a rotation while maintaining a grip on the handle 803. To aid in such an operation, the first and second connector plates 818,819 may be provided with protrusions or recesses to make the rotating of the sensor support 710 more convenient to the user. In the example embodiment illustrated in FIG. 8, first grip recesses 821 are provided in corresponding locations on the first and second connector plates 818,819, and second grip recesses 822 are provided at other corresponding locations on the first and second connector plates 818,819. The user is able to place a finger along these grip recesses to make the rotation operation more convenient.

In the example embodiment illustrated in FIG. 8, the coupling of the sensor support 710 and the driver 702 is maintained by a stopper member 808 that is provided on the driver shaft 840. The driver shaft 840 extends through openings in the first and second connector plates 818,819 to a point that enables the hex key 805 to be in position to engage the attachment screw 301 provided to the vibration sensor 104. The stopper member 808 is provided on the driver shaft at a point between the first and second connector plates 818,819 and thus maintains the presence of the driver shaft 804 extended through the first and second connector plates 818, 819. In various example embodiments, the stopper member 808 may be a clamp fixed to the driver shaft 804. However, the stopper member 808 may take various other forms that will maintain the presence of the driver shaft between the first and second connector plates 818,819.

The openings in the first and second connector plates 818, 819 through which the driver shaft 804 extends are configured such that the driver shaft 804 is able to both rotate and move back and forth. In various example embodiments, the driver 701 may be biased in the direction of the sensor support 710. With such a bias, the driver 702 is able to be moved back to accommodate an initial position of the head of the attachment screw 301, but is biased forward to maintain contact with the attachment screw 301. The driver 701 may be biased by a resilient member, such as the spring 806 illustrated in FIG. 8. The spring 806 in this example embodiment is provided between the first connector plate 818 and the stopper member 808, and works in conjunction with the stopper member 808 both to bias the driver 702 and maintain the driver shaft 804 within the sensor support 710.

In various example embodiments of the present general inventive concept, one or more spacers may be provided on the driver shaft 804 between the handle 803 and the first connector plate 818 to facilitate the rotation of the driver 702 relative to the sensor support 710. In the example embodiment illustrated in FIG. 8, a pair of washers 807 is provided as the spacers. The washers 807 both facilitate the rotation of the driver 702 and reduce wear that would otherwise be caused between the surfaces of the handle 803 and the first connector plate 818.

Figure 9:
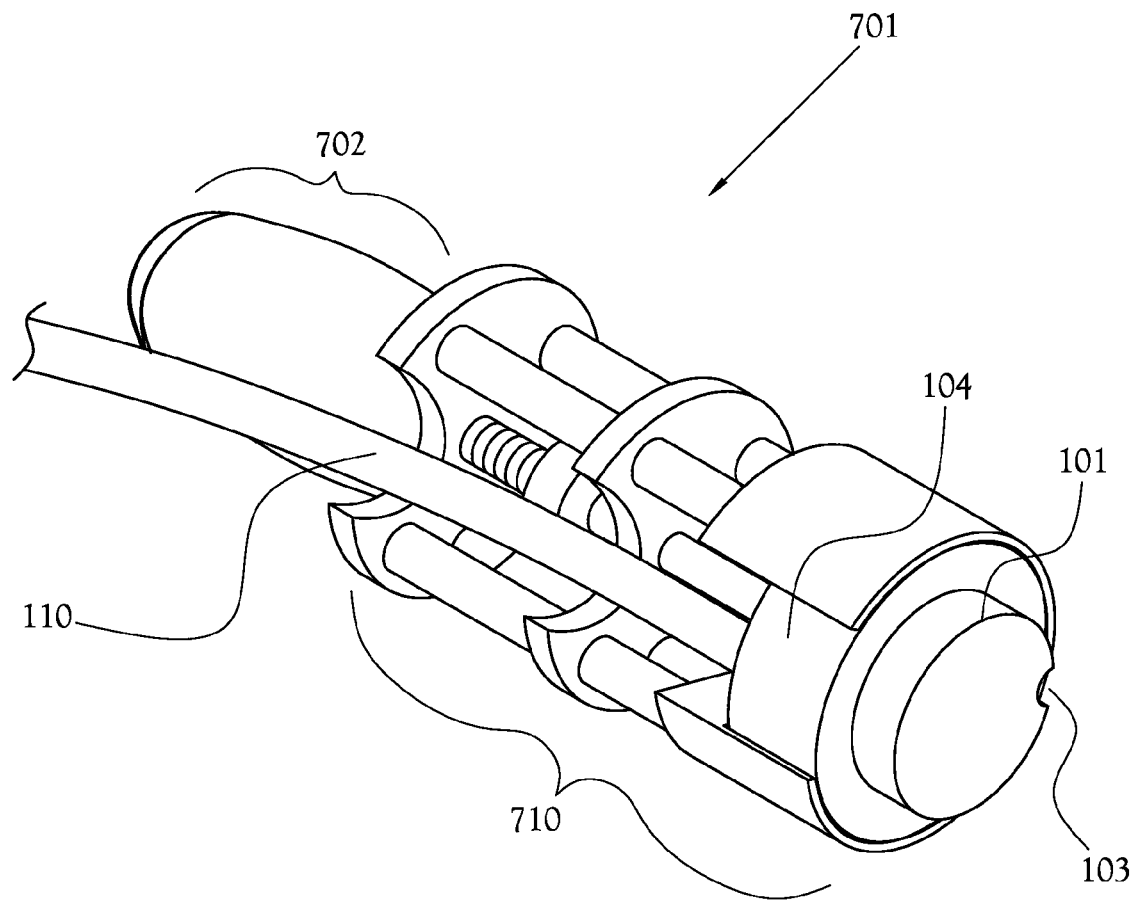
FIG. 9 illustrates the sensor mounting device of FIG. 7 being used in a vibration sensor mounting operation.

FIG. 9 illustrates the sensor mounting device 701 of FIG. 7 being used in a vibration sensor mounting operation. While the mounting pad 101 is illustrated, the machine 102 to which the mounting pad 101 is fixed has been omitted for clarity. In the example embodiment illustrated in FIG. 9, the vibration sensor 104 is seated inside the helmet 811 in contact with the helmet floor 815, and the data cable 110 is accommodated by the cable recess 820. The sensor support 710 has been rotated to properly orient the vibration sensor 104 in relation to the alignment pin 105 and the alignment recess 103, and the driver 702 is rotated to fix the vibrations sensor 104 to the mounting pad 101 with the attachment screw 301.

Figure 10:
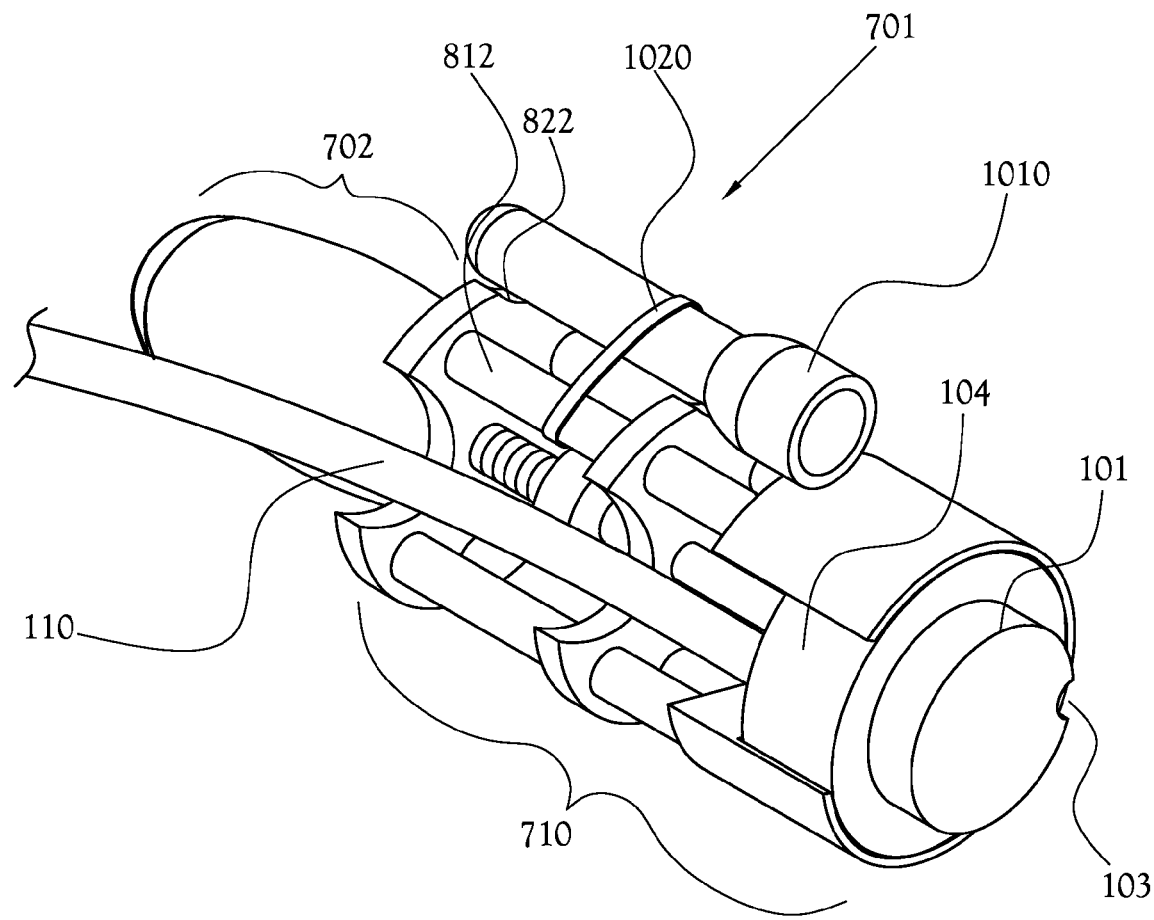
FIG. 10 illustrates a one-hand operable sensor mounting device according to another example embodiment of the present general inventive concept.

FIG. 10 illustrates a one-hand operable sensor mounting device according to another example embodiment of the present general inventive concept. In the example embodiment illustrated in FIG. 10, the sensor mounting device 701 of FIG. 7 is provided with an illuminating device 1010 to aid the operator in conditions in which low lighting and/or limited access makes it difficult for the operator to see the mounting pad 101. The illuminating device 1010 may be, for example, an incandescent flashlight, an LED, or the like. In the example embodiment illustrated in FIG. 10, the illuminating device 1010 is accommodated by the second grip recesses 822 illustrated in FIG. 8, and secured to the sensor mounting device 701 by a securing strap 1020. The securing strap 1020 may be, for example, an elastic band provided around one or more of the connector pins 812 and the illuminating device 1010. However, it is understood that the illuminating device 1010 may be fixed to the sensor mounting device 701 in any of a number of different locations, as well as by means other than the securing strap 1020. For example, the illuminating device may be fixed to other structural components of the sensor mounting device, and may be fixed by an adhesive, Velcro, and so on.

As previously discussed, another aspect of improving the speed of mounting a vibration sensor the manner in which the vibration sensor and attachment tool are carried when moving from one measurement location to the next on the same or a different machine. Since the operator is often moving about in restrictive areas in which both hands may be needed to prevent potential accidents, such transport can be facilitated by a carrier, such as a holster, to receive both the vibration sensor and the attachment tool in such a manner that they remain attached to one another and are inserted or withdrawn as a single unit. In other words, the attachment tool and vibration sensor may remain coupled to one another at all stages of transport, and the operator may choose to only separate the attachment tool from the vibration sensor when the vibration sensor is coupled to the mounting pad of the machine. Thus, after removing the vibration sensor from the mounting pad, the operator can simply place the assembly of the attachment tool, i.e., the sensor mounting device, and the vibration sensor into the carrier, and withdraw the assembly when ready to install the vibration sensor at the next location.

Figure 11:
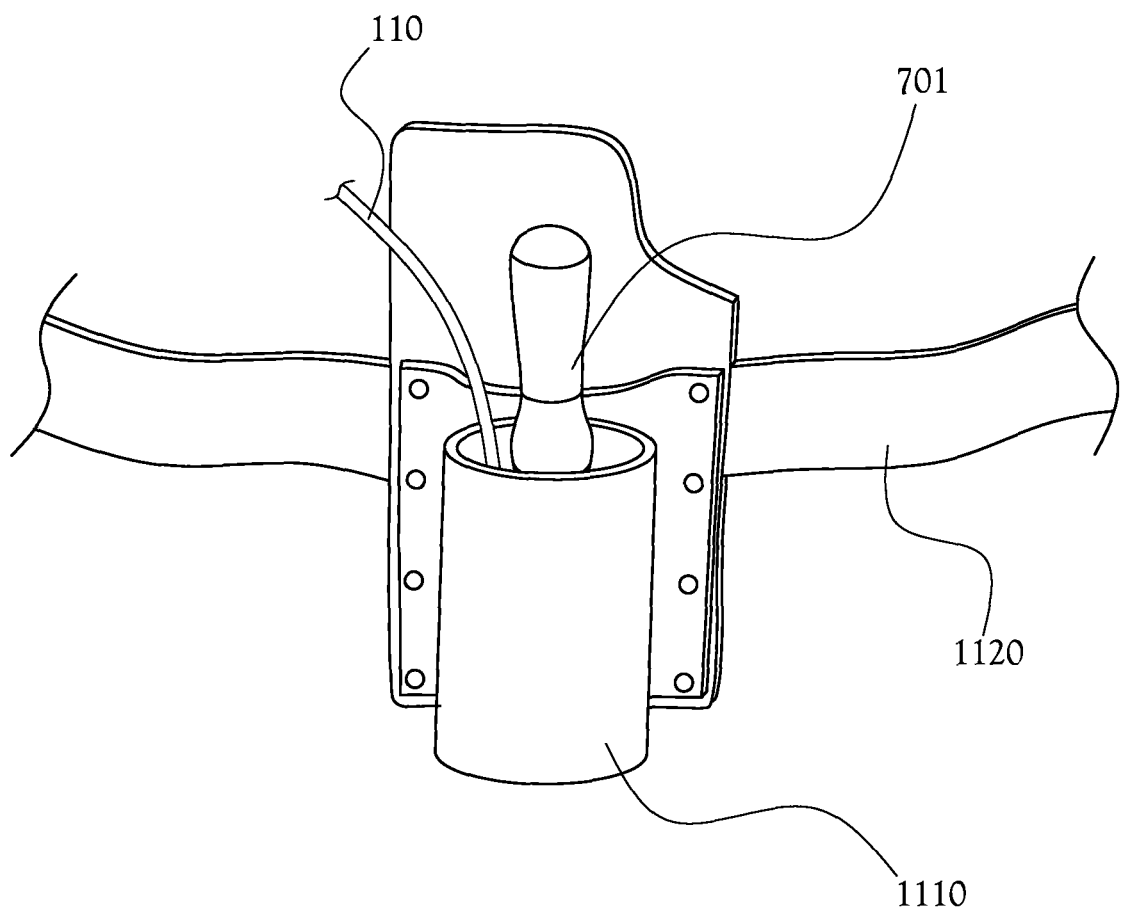
FIG. 11 illustrates a carrier for an assembled vibration sensor and sensor mounting device according to example embodiment of the present general inventive concept.

FIG. 11 illustrates a carrier for an assembled vibration sensor and sensor mounting device according to example embodiment of the present general inventive concept. In the example embodiment illustrated in FIG. 11, the carrier 1110 is configured to accommodate the assembly of the sensor mounting device 701 coupled to the vibration sensor 104. As shown in the drawing, the data cable 110 extending from the vibration sensor, which may be attached to vibration sensors that do not transmit data wirelessly, is also easily accommodated inside the carrier 1110. In this example embodiment, the carrier 1110 is a holster that is attached to a belt 1120. The operator is able to conveniently wear the belt 1120 having the holster, or carrier 1110, provided thereto, and can simply draw the vibration sensor/sensor mounting device assembly with one hand so as to mount the vibration sensor 104 on the mounting pad 101. Similarly, the operator is able to conveniently place the vibration sensor/sensor mounting device assembly back in the carrier 1110 after removing the vibration sensor 104 from the mounting pad 101. In such a manner, using the system of the sensor mounting device 701 and the carrier 1110, the operator is able to perform the mounting and dismounting procedure, as well as travel from one destination to the next, without having to use a second hand.

In various example embodiments described above, and apparatus has been provided to allow a user to mount a vibration sensor onto a mounting pad with a one-handed operation. In some example embodiments, an attachment screw is configured to releasably retain a ball-head hex key of a driver so that the user can release the grip of the driver or vibration sensor while maintaining a coupling of the driver to the attachment screw, which is further coupled to the vibration sensor. In other example embodiments, a sensor mounting device includes a sensor support coupled to a driver, the sensor support holding and protecting the vibration sensor and allowing the user to guide and orient the vibration sensor onto the mounting pad while maintaining a grip on the driver. While various example embodiments have described the alignment pin and alignment recess used in triaxial sensors, the present general inventive concept is also applicable to vibration sensors which do not have such alignment devices, such as single axis sensors. The benefits of the present general inventive concept would increase the convenience of stud mounting such single axis and other sensors, which provides improved results over magnetically mounted sensors.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, the alignment pin could be located on the mounting pad, and the corresponding alignment recess built into the sensor, in which case various examples of the present general inventive concept would provide the pilot section of the attachment screw to extend farther from the vibration sensor than alignment pin extended from the mounting pad. Although such a configuration is not discussed in detail in the examples previously described, such example embodiments would fall within the scope of the present general inventive concept. Regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. An attachment screw to secure a vibration sensor to a mounting pad, the vibration sensor having a through hole to receive the attachment screw and an alignment pin extending to be accommodated in an alignment recess of the mounting pad, the attachment screw comprising:
    a head portion having a recessed socket sufficiently deep to receive a ball-end hex driver such that a hex cavity adjacent to the ball-end hex driver is received within the recessed socket;
    a detent provided on a side wall of the recessed socket to apply a force to the hex cavity such that the hex key is releasably retained in the recessed socket; and
    a cylindrical shaft extending from the head portion, the shaft having a threaded section provided between first and second unthreaded sections, the first and second unthreaded sections having a diameter smaller than the threaded section, and the second unthreaded section being distal to the head portion and configured such that at least a portion thereof extends further than the alignment pin when the attachment screw is in the through hole and the head portion contacts the vibration sensor.

2. The attachment screw of claim 1, wherein the first unthreaded section is configured to extend past a threaded portion of the through hole while the attachment screw is in the through hole and the head portion contacts the vibration sensor.

3. The attachment screw of claim 1, further comprising a resilient member to bias the detent toward a radial center of the recessed socket.

4. The attachment screw of claim 3, further comprising a recess in the head portion, the detent being provided in the recess.

5. The attachment screw of claim 4, wherein the recess comprises a tapered opening to allow the detent to partially extend into the recessed socket.

6. The attachment screw of claim 3, wherein the resilient member is an elastic band provided around the head portion.

7. The attachment screw of claim 6, further comprising a groove around a perimeter of the head portion to receive the elastic band.

8. The attachment screw of claim 6, wherein the elastic band is a polyurethane ring.

9. The attachment screw of claim 1, wherein the threaded section is configured so as to extend a shorter distance from the vibration sensor than does the alignment pin when the attachment screw is in the through hole and the head portion contacts the vibration sensor.

10. The attachment screw of claim 1, wherein the threaded section is configured so as to extend farther from the vibration sensor than does the alignment pin when the attachment screw is in the through hole and the head portion contacts the vibration sensor.

11. The attachment screw of claim 1, further comprising a frictional element provided to at least a portion of the attachment screw to provide friction between the attachment screw and the vibration sensor to aid in orientation of the vibration sensor during a mounting operation.

12. The attachment screw of claim 11, wherein the frictional element is provided to at least a portion of the first unthreaded section of the attachment screw.

13. The attachment screw of claim 11, wherein the frictional element is a polymer coating.

14. A handheld device to secure a vibration sensor to a mounting pad, the vibration sensor having an alignment pin extending to be accommodated in an alignment recess of the mounting pad, the device comprising:
    a driver having a handle portion and a driver shaft extending therefrom, the driver shaft having a driver portion at a distal end; and
    a vibration sensor support configured to support the vibration sensor such that the driver portion has access to an attachment screw threaded through the vibration sensor, and coupled to the driver such that the vibration sensor support is rotatable around a longitudinal axis of the driver shaft and slidable along a longitudinal portion of the driver shaft.

15. The device of claim 14, wherein the vibration sensor support comprises a helmet to receive the vibration sensor, the helmet including a helmet floor to contact a back surface of the vibration sensor, a helmet side portion to support at least a portion of the perimeter surface of the vibration sensor, and a helmet recess in the helmet floor to accommodate the attachment screw.

16. The device of claim 15, wherein the helmet recess extends to the helmet side portion to accommodate a data cable of the vibration sensor.

17. The device of claim 15, wherein the vibration sensor support further comprises first and second connector plates spaced away from the helmet by a plurality of connector pins, the first and second connector plates configured to receive the driver shaft through respective central openings thereof, the central openings being sized such that the first and second connector plates are rotatable about the driver shaft and slidable along the longitudinal portion of the driver shaft.

18. The device of claim 17, further comprising a stopper member provided to the driver shaft between the first and second connector plates to maintain a central portion of the driver shaft between the first and second connector plates.

19. The device of claim 18, further comprising a resilient member between the stopper member and the first or second connector plate to bias the driver in the direction of the helmet.

20. The device of claim 19, wherein the resilient member is a spring through which at least a portion of the driver shaft passes.

21. The device of claim 14, wherein the driver is biased toward the vibration sensor support.

22. The device of claim 17, further comprising one or more spacers between the handle portion and the vibration sensor support to allow rotation without contact between the handle portion and the vibration sensor support.

23. The device of claim 22, wherein the one or more spacers are one or more washers provided about the driver shaft.

24. The device of claim 17, further comprising a recess provided to corresponding outer portions of the first and second connector plates to accommodate a data cable of the vibration sensor.

25. The device of claim 24, further comprising at least one pair of corresponding grip recesses respectively provided to the first and second connector plates.

26. The device of claim 14, further comprising an illuminating device coupled to the vibration sensor support.

27. The device of claim 26, further comprising an accommodating portion in the vibration sensor support in which the illuminating device is removably coupled.

28. The device of claim 27, wherein the illuminating device is removably coupled to the vibration sensor support by at least one securing strap.

29. The device of claim 28, wherein the at least one securing strap is an elastic strap.

30. A system to store and/or transport a sensor mounting device supporting a vibration sensor, the system comprising:
a handheld device to secure a vibration sensor to a mounting pad, the device comprising:
a driver having a handle portion and a driver shaft extending therefrom, the driver shaft having a driver portion at a distal end, and
a vibration sensor support configured to support the vibration sensor such that the driver portion has access to an attachment screw threaded through the vibration sensor, and coupled to the driver such that the vibration sensor support is rotatable around a longitudinal axis of the driver shaft and slidable along a longitudinal portion of the driver shaft; and
a carrier to accommodate the handheld device while the handheld device supports the vibration sensor.

31. The system of claim 30, further comprising a belt coupled to the carrier.

32. The system of claim 30, wherein the carrier encloses a substantial portion of the vibration sensor support.

* * * * *